US011258874B2

(12) United States Patent
Walsh et al.

(10) Patent No.: US 11,258,874 B2
(45) Date of Patent: Feb. 22, 2022

(54) METHOD AND SYSTEM FOR SENSING INFORMATION, IMPUTING MEANING TO THE INFORMATION, AND DETERMINING ACTIONS BASED ON THAT MEANING, IN A DISTRIBUTED COMPUTING ENVIRONMENT

(71) Applicant: GLOBALLOGIC, INC., San Jose, CA (US)

(72) Inventors: James Francis Walsh, Palo Alto, CA (US); Suhail Murtaza Khaki, Pune Maharashtra (IN); Manu Sinha, New Dehli (IN); Juan Manuel Caracoche, Buenos Aires (AR); Artem Mygaiev, Kiev (UA); Francis Michael Borkin, Kyiv (UA); Bhaskar Chaturvedi, Ghaziabad (IN); Mayank Gupta, Chantilly, VA (US); Biju Varghese, Karnataka (IN)

(73) Assignee: GLOBALLOGIC, INC., San Jose, CA (US)

( * ) Notice: Subject to any disclaimer, the term of this patent is extended or adjusted under 35 U.S.C. 154(b) by 10 days.

(21) Appl. No.: 15/561,791

(22) PCT Filed: Mar. 25, 2016

(86) PCT No.: PCT/US2016/024370
§ 371 (c)(1),
(2) Date: Sep. 26, 2017

(87) PCT Pub. No.: WO2016/160626
PCT Pub. Date: Oct. 6, 2016

(65) Prior Publication Data
US 2018/0084073 A1  Mar. 22, 2018

Related U.S. Application Data

(60) Provisional application No. 62/139,548, filed on Mar. 27, 2015.

(51) Int. Cl.
*H04L 29/08* (2006.01)
(52) U.S. Cl.
CPC .................. *H04L 67/2819* (2013.01)
(58) Field of Classification Search
CPC .................................................... H04L 67/2819
(Continued)

(56) References Cited

U.S. PATENT DOCUMENTS 8,862,715 B1 * 10/2014 Tom ................. H04L 43/50
709/223
8,868,751 B2 * 10/2014 Kylau .................... G06F 9/54
709/226

(Continued)

FOREIGN PATENT DOCUMENTS

WO   2007052959 A1   5/2007
WO   WO-2014026240 A1 *  2/2014   ......... G06F 17/2785

OTHER PUBLICATIONS

International Search report and Written Opinion for Serial No. PCT/US16/24370 dated Jun. 27, 2016.

*Primary Examiner* — Schquita D Goodwin
(74) *Attorney, Agent, or Firm* — Concept IP LLP; Michael Zarrabian

(57) ABSTRACT

A machine implemented method and system, including: receiving at a near real-time processor module, one or more tenant-specific business objects from a message handler module; receiving at the near real-time processor module, contextual data related to the received one or more tenant-specific business objects from a platform analytics module; forming at the near real-time processor module, one or more events by applying one or more pre-defined analytic models to the received contextual data and the received one or more tenant-specific business objects; receiving at a message publisher module, one or more events from the near real- (Continued)

time processor module; and transmitting the received one or more events to one or more subscribers for the one or more events.

20 Claims, 21 Drawing Sheets

(58) Field of Classification Search
USPC .......................................................... 709/223
See application file for complete search history.

(56) References Cited

U.S. PATENT DOCUMENTS

| | | | |
|---|---|---|---|
| 8,898,264 B1* | 11/2014 | Walther | G06F 16/9024 |
| | | | 709/223 |
| 8,909,748 B1* | 12/2014 | Chaudhari | H04L 47/808 |
| | | | 709/223 |
| 10,311,015 B2* | 6/2019 | Nixon | G06F 15/17331 |
| 2003/0105854 A1* | 6/2003 | Thorsteinsson | G06F 9/542 |
| | | | 709/223 |
| 2008/0126110 A1 | 5/2008 | Haeberle et al. | |
| 2010/0162268 A1 | 6/2010 | Thomas et al. | |
| 2013/0151443 A1* | 6/2013 | Kyaw | G06N 20/10 |
| | | | 706/12 |
| 2013/0151690 A1* | 6/2013 | Shah | G06Q 10/10 |
| | | | 709/224 |
| 2013/0262074 A1* | 10/2013 | Heidasch | G06F 16/2457 |
| | | | 703/22 |
| 2014/0222899 A1 | 8/2014 | Supramaniam et al. | |
| 2014/0244568 A1* | 8/2014 | Goel | H04W 4/08 |
| | | | 706/52 |
| 2015/0019710 A1* | 1/2015 | Shaashua | G06F 16/35 |
| | | | 709/224 |
| 2015/0089576 A1* | 3/2015 | Poroor | H04L 63/20 |
| | | | 726/1 |
| 2015/0112885 A1* | 4/2015 | Fadell | G08B 25/008 |
| | | | 705/330 |
| 2015/0143254 A1* | 5/2015 | Kritt | H04L 51/16 |
| | | | 715/752 |
| 2015/0244591 A1* | 8/2015 | Brown | H04L 12/12 |
| | | | 709/223 |
| 2015/0328550 A1* | 11/2015 | Herzig | A63F 13/30 |
| | | | 463/31 |
| 2016/0088049 A1* | 3/2016 | Seed | H04L 67/18 |
| | | | 709/203 |
| 2016/0188571 A1* | 6/2016 | Daniel | G06F 16/9024 |
| | | | 704/9 |
| 2016/0232116 A1* | 8/2016 | Bone | H04W 4/70 |
| 2016/0234686 A1* | 8/2016 | Bone | G06F 13/4027 |

* cited by examiner

FIG. 9

Java Implementation Stack

| Software Function | Technology | License |
|---|---|---|
| Programming Language | | |
| Primary Programming Language | Java | Java Oracle License |
| Frameworks | | |
| Web Application Framework | Vert.x | Apache-2.0 |
| IoC Framework | Spring | Apache-2.0 |
| JavaScript MVC Framework | AngularJS | MIT License |
| Security Framework | Apache Shiro | Apache-2.0 |
| Logging Framework | LogBACK | Logback License |
| Software Components | | |
| Message Queue | Apache Kafka | Apache-2.0 |
| Stream Processing | Apache Spark Streaming | Apache-2.0 |
| Rule Engine | JBoss Drools | ASL 2 |
| Workflow Management | JBoss Drools (jBPM) | ASL 2 |
| Notification Service | -- | |

| | Storage | |
|---|---|---|
| RDBMS | MySQL | GPL Version 2 |
| Document-oriented NoSQL | Couchbase | Apache License (Community edition) |
| Columnar NoSQL | HBase | Apache-2.0 |
| NewSQL (In-memory DB) | VoltDB | GNU Affero General Public License v3 |
| DB Encryption (TDE) | Gazzang | Proprietary |
| Distributed File System | HDFS | Apache-2.0 |
| Embedded DB | Couchbase Lite | Apache License (Community edition) |
| Machine to Machine (M2M) | | |
| M2M Framework | AllJoyn | ISC license |
| M2M Security Server | AllJoyn | ISC license |
| Gateway | Objective C & Java | |
| Analytics | | |
| Data storage | HBase | Apache-2.0 |
| Batch processing | Apache Spark | Apache-2.0 |
| Reporting DB | Infobright | |
| Visualization Tool | Jaspersoft | |

MS Implementation Stack

| Software Function | Technology | License |
|---|---|---|
| Programming Language | | |
| Primary Programming Language | C# | |
| Frameworks | | |
| Web Application Framework | ASP.NET MVC | Apache-2.0 |
| IoC Framework | Autofac | MIT License |
| JavaScript MV* Framework | AngularJS | MIT License |
| Security Framework | Dot Net Framework Security | |
| Logging Framework | log4net | Apache-2.0 |
| Software Components | | |
| Message Queue | Apache Kafka | Apache-2.0 |
| Stream Processing | Apache Spark Streaming | Apache-2.0 |
| Rule Engine | Custom built | |
| Workflow Management | Custom built | |
| Notification Service | Custom built | |

| Storage | | |
|---|---|---|
| RDBMS | Sql Server 2014 | Proprietary |
| Document-oriented NoSQL | Couchbase | Apache License (Community edition) |
| Columnar NoSQL | HBase | Apache-2.0 |
| NewSQL (in-memory DB) | VoltDB | GNU Affero General Public License v3 |
| DB Encryption (TDE) | Sql Server 2014 Inbuilt TDE | Proprietary |
| Distributed File System | HDFS | Apache-2.0 |
| Embedded DB | SqLite | Public |
| Analytics | | |
| Data storage | HBase | Apache-2.0 |
| Batch processing | Apache Spark | Apache-2.0 |
| Reporting DB | Infobright | |
| Visualization Tool | Jaspersoft | |

FIG. 10

METHOD AND SYSTEM FOR SENSING INFORMATION, IMPUTING MEANING TO THE INFORMATION, AND DETERMINING ACTIONS BASED ON THAT MEANING, IN A DISTRIBUTED COMPUTING ENVIRONMENT

CROSS-REFERENCE TO RELATED APPLICATION

This application is a U.S. National Phase Patent Application under 35 U.S.C. § 371 of International Application Number PCT/US2016/024370, filed Mar. 25, 2016, which claims the priority benefit of U.S. Provisional Patent Application Ser. No. 62/139,548, filed Mar. 27, 2015, both of which are hereby incorporated herein by reference in their entirety for all purposes.

TECHNICAL FIELD

The present disclosure relates to the Internet of Things (IoT), and more particularly to scalable systems for hosting IoT applications.

BACKGROUND

With the advent of the Internet, computing devices are enabled to connect to networks. This provides communication between users and between computing devices such as tablets and computer systems. The connected computing devices also store information and logic for performing tasks.

SUMMARY

An exemplary machine implemented method may include: receiving at a platform gateway module, data transmitted from one or more resources; forming at the platform gateway module, one or more messages based on the data from the one or more resources; receiving at a message collector module one or more messages formed by the platform gateway module; transmitting from the message collector module, the received one or more messages to a platform persistence module for storage; receiving at a tenant handler module, one or more messages from the message collector module; mapping at the tenant handler module, the received one or more messages to a tenant of a plurality of tenants; receiving at a message handler module, the one or more messages mapped to the tenant from the tenant handler module; forming at the message handler module, one or more tenant-specific business objects by applying a business logic to the one or more messages based on the mapped tenant; receiving at a near real-time processor module, the one or more tenant-specific business objects from the message handler module; receiving at the near real-time processor module, contextual data related to the received one or more tenant-specific business objects from a platform analytics module; forming at the near real-time processor module, one or more events by applying one or more pre-defined analytic models to the received contextual data and the received one or more tenant-specific business objects; receiving at a message publisher module, one or more events from the near real-time processor module; and transmitting the received one or more events to one or more subscribers for the one or more events.

Additional computer-implemented method embodiments may include: transmitting from the message handler module, the one or more tenant-specific business objects to the platform persistence module for storage. Additional computer-implemented method embodiments may include: receiving at the platform persistence module, external data from an external services orchestrator module. Additional computer-implemented method embodiments may include: receiving at the platform analytics module, data from the platform persistence module, where the data from the platform persistence module includes at least one of: messages from the message collector module, tenant-specific business objects from the message handler module, and external data from the external services orchestrator module. Additional computer-implemented method embodiments may include: forming at the platform analytics module, the contextual data containing a real-time view generator module including a near-real time view of data and a batch view generator module including a historical data that does not overlap with the near-real time view of data.

Additional computer-implemented method embodiments may include: receiving at the near real-time processor module, contextual data derived from machine learning based on previously received messages, business objects and external data from the platform analytics module. In additional computer-implemented method embodiments, the received data includes at least one of: an observed status data, a request data, and an automated sensor data. In additional computer-implemented method embodiments the one or more resources includes one or more of: a sensor, an actuator, a smart device, a smartphone, a set-top box, an external machine-to-machine (M2M) enabler, a human input, and an organism input. In additional computer-implemented method embodiments forming the one or more messages at the platform gateway module may further include: determining at the platform gateway module, a type of resource for the received data; and transforming at the platform gateway module, the received data into the message based on the determined type of resource, where the message is a format usable by the message collector module. In additional computer-implemented method embodiments, transforming the received data into the message at the platform gateway module further includes: forming at the platform gateway module, an abstracted data, where the abstracted data abstracts out any device-specific or communication protocol-specific information based on the determined type of resource.

In additional computer-implemented method embodiments the message collector module receives the one or more messages formed by the platform gateway module asynchronously. In additional computer-implemented method embodiments, transmitting the one or more events to one or more subscribers further includes: receiving at a message listener module, the one or more events; and determining at the message listener module, a next step in a workflow based on the received event. In additional computer-implemented method embodiments, executing the next step in the workflow may further include: receiving at a workflow manager module, a workflow task that requires triggering an actuator in resources, wherein a Worker associated with the workflow task does cause: sending a message to a Platform SDK to trigger the Actuator, wherein the Platform Services does cause: sending an activation message to the platform Gateway module, which maps the activation message to the appropriate data format to activate such device and initiates: sending such actuator data to resources; where such data is used to trigger such actuator by at least one of: controller, software systems, and external M2M enablers. In additional computer-implemented method embodiments, a platform management portal or apps does seek to activate an actuator in resources: sending of an activation message to Platform API Services, to trigger such actuator, wherein the platform services does cause sending of an activation message to Platform Gateway, which maps such message to the appropriate data format to activate such actuator and initiates; and sending such actuator data to Resources; where such data is used to trigger such actuator by at least one of: controller, software systems, or external M2M enablers. Additional computer-implemented method embodiments may include: forming at the platform analytics module, the contextual data, where the contextual data contains a result of an analytic model that algorithmically combines a source data from one or more of: data from the platform persistence module, external data, data from an external machine-to-machine (M2M) enabler, data from a software system, data from an enterprise systems, data interactively supplied by one or more users of applications, predictive data inferred from the source data, and machine learning data inferred from the source data.

An exemplary system may include: a platform gateway module configured to: receive data from one or more resources; and form one or more messages based on the received data; a message collector module configured to: receive one or more messages formed by the platform gateway module; and transmit the received one or more messages to a platform persistence module for storage; a tenant handler module configured to: receive one or more messages from the message collector module; and map the received one or more messages to a tenant of a plurality of tenants; a message handler module configured to: receive the one or more messages mapped to the tenant from the tenant handler module; and form one or more tenant-specific business objects by applying a business logic to the one or more messages based on the mapped tenant; a near real-time processor module configured to: receive the one or more tenant-specific business objects from the message handler module; receive contextual data related to the received one or more tenant-specific business objects from a platform analytics module; and form one or more events by applying one or more pre-defined analytic models and context to the received one or more tenant-specific business objects; a message publisher module configured to: receive the one or more events from the near real-time processor module; and transmit the received one or more events to one or more subscribers for the one or more events.

In additional system embodiments, the formed one or more messages are based on at least one of: a business rule, a data aggregation, an abstraction of device-specific information, and an abstraction of protocol-specific information. In additional system embodiments, the message handler module may be further configured to: transmit the one or more tenant-specific business objects to the platform persistence module for storage. In additional system embodiments, the platform persistence module may be further configured to: receive external data from an external services orchestrator module. In additional system embodiments, the platform analytics module may be further configured to: receive data from the platform persistence module, where the data from the platform persistence module includes at least one of: messages from the message collector module, tenant-specific business objects from the message handler module, and external data from the external services orchestrator module. In additional system embodiments, the platform analytics module may be further configured to: form the contextual data containing a real-time view generator module including a near-real time view of data and a batch view generator module including a historical data that does not overlap with the near-real time view of data. In additional system embodiments, the near real-time processor module may be further configured to: receive contextual data derived from machine learning based on previously received messages, business objects and external data from the platform analytics module. In additional system embodiments, the received data includes at least one of: an observed status data, a request data, and an automated sensor data. In additional system embodiments, the one or more resources include one or more of: a sensor, an actuator, a smart device, a smartphone, a set-top box, an external machine-to-machine (M2M) enabler, a human input, and an organism input. In additional system embodiments, the platform gateway module may be further configured to: determine a type of resource for the received data; and transform the received data into the message based on the determined type of resource, where the message may be a format usable by the message collector module.

In additional system embodiments, the platform gateway module may be further configured to: form an abstracted data, where the abstracted data abstracts out any device-specific or communication protocol-specific information based on the determined type of resource. In additional system embodiments, the message collector module receives the one or more messages formed by the platform gateway module asynchronously. Additional system embodiment include a message listener module configured to: receive the one or more events; and determine a next step in a workflow based on the received event. In additional system embodiments, the platform analytics module may be further configured to: form the contextual data, where the contextual data contains a result of an analytic model that algorithmically combines a source data from one or more of: data from the platform persistence module, external data, data from an external machine-to-machine (M2M) enabler, data from a software system, data from an enterprise systems, data interactively supplied by one or more users of applications, predictive data inferred from the source data, and machine learning data inferred from the source data.

BRIEF DESCRIPTION OF THE DRAWINGS

The foregoing features and other features will now be described with reference to the drawings of various aspects. In the drawings, the same components have the same reference numerals. The illustrated aspects are intended to illustrate, but not to limit the present disclosure. The drawings include the following Figures:

FIG. 9 shows a Java stack for implementation of the system;

FIG. 10 shows an MS stack for implementation of the system;

DETAILED DESCRIPTION

The following description is made for the purpose of illustrating the general principles of the embodiments disclosed herein and is not meant to limit the concepts disclosed herein. Further, particular features described herein can be used in combination with other described features in each of the various possible combinations and permutations. Unless otherwise specifically defined herein, all terms are to be given their broadest possible interpretation including meanings implied from the description as well as meanings understood by those skilled in the art and/or as defined in dictionaries, treatises, etc.

Embodiments of an Internet of Things (IoT) method and system disclosed herein allow sensing information, imputing meaning to the information, and determining actions based on that meaning, in a distributed computing environment. Embodiments further provide a method and system for enabling computing devices connected to the Internet to interact with each other and with people. Computing devices may be those embedded on inanimate objects, including inanimate objects attached to animate ones including, e.g., wearable and implantable devices, tattoo electronics, etc.

Embodiments of the disclosed IoT system involve distributed sensors and connected devices, with an increasingly smart brain to acquire and act on near real-time information.

The disclosed IoT system provides context and interpretation, where information such as the data a given sensor generates, is assigned "meaning," which is assigning meaning to information about the object being sensed, and then acting on that "understanding." The disclosed IoT system assigns meaning to the data it receives by considering the "context" of the information, then analyzing it by considering both the current, historical, and/or other information relevant to that context. The system then automatically initiates the appropriate action, based on this analysis. It is the contextualization and analysis of messages together with the resulting actions that give value to what would otherwise be merely incoming data to be stored or processed in a mechanical, non-contextualized fashion. The disclosed IoT system provides infusion of data with meaning.

Figure 1:
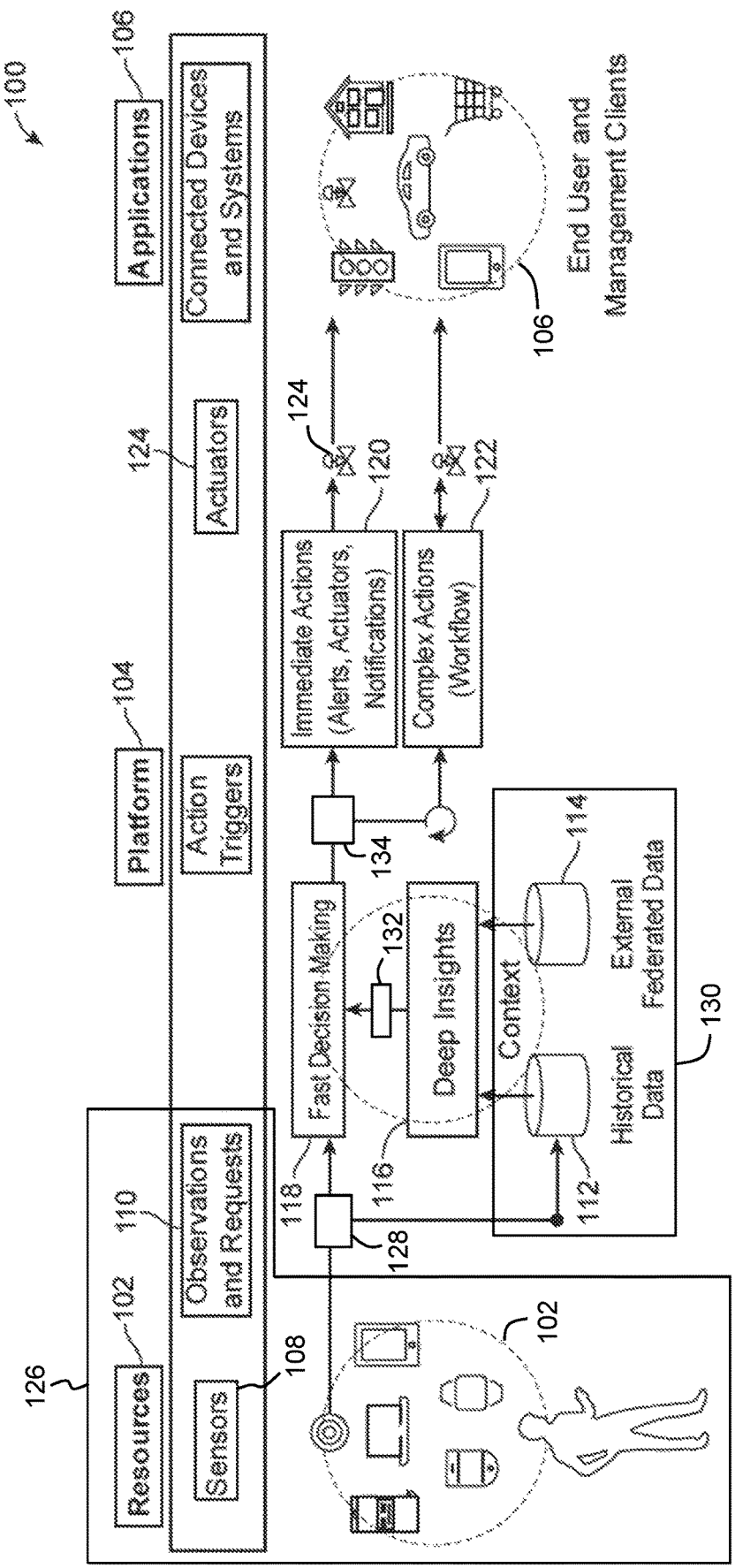
FIG. 1 shows an exemplary embodiment of a high-level end-to-end architecture overview.

FIG. 1 shows an exemplary embodiment of a high-level end-to-end architecture overview 100. With reference to the figures, at the high level, the IoT system disclosed herein comprises three modules: (i) a Resources module 102, 126, (ii) a Platforms module 104, and (iii) an Applications module 106, as described in further detail below.

In one embodiment, the Resources module 102, 126 includes sources of data that, after analysis, will bring business or other value to end user of Application 106. Resources in the Resources module 102, 126 may include sensors, smart devices, smartphones, and even human or animal inputs (e.g., a person or pet pressing a button to indicate that they are hungry). Examples of components in the Resources module 102, 126 include:

A Software Systems module (202, FIG. 2A): These are the systems comprising various software components to perform business transactions. These systems generate, capture, and/or store data as part of their essential function (e.g., invoice, inventory, location, accounting, environmental or other information systems), and/or they generate data as a by-product (e.g., Error Logs, Transaction Logs, etc.). In one embodiment, these systems may also make data available on request through their application programming interfaces (APIs) to external systems with appropriate permissions to access such data. Such external systems may also be considered "actuators" in the context of an IoT system. The action effected by such IoT system may be to transfer data to and/or evoke functions of such software systems through their APIs. This generally results in storage of data effected by physical changes to magnetic, solid state and/or other storage media, computations, displays and/or other such actions.

These are third-party software systems external to the disclosed system (e.g., shipping, receiving and logistics systems). These systems may provide services and interfaces to access data describing some physical event or condition (e.g., weather, or the receipt of a package) that can be regarded as sensor input by the disclosed system. Such third party systems may also provide access to actuators hosted on their network (e.g., an API to initiate the pick up of a package for delivery). The Platform may ingest such "sensor" data from and transmit such "actuator" data to these third-party providers via the interfaces they provide. The Platform handles the data coming from and transmitted to these "sensors" and "actuators" in the same way as it handles data coming from devices and sent to actuators directly.

A Device Network module (204, FIG. 2A): It is a network of devices connected to sensors and/or actuators. Sensors capture or measure the information from physical objects, and actuators control the behavior of physical objects based on information supplied to them. This information is transmitted by and to devices over a network. Physical objects are the things that are monitored and are of interest to users. In one embodiment, actuators effect a physical activity as a result of data being sent to them, or commands given to them. Such physical activities may include displaying or presenting information in a human-readable form by stimulating the production or reflection of light and/or movement of mechanical components; triggering audio signals by generating sound waves; triggering sense impressions through haptic vibrations; opening or closing a valve; activating a servo or solenoid; and/or effecting some other physical change in an object or computer system. The Gateways and Controllers are bi-directional, and send the messages to those actuators (e.g., actuators 204 as well as the actuator-type functionality provided by External M2M Enablers 206 and Software Systems 202. The triggering of a given actuator is driven by the Applications (206), who communicate with the Platform via the Platform SDK (223) or (for apps not on the App Platform) 274.

An External Machine to Machine (M2M) Enablers module (206, FIG. 2A): These are third party service providers or proprietary systems for enabling a machine-to-machine (M2M), IoT or other sensor-network. These M2M enablers provide services to access the data captured from the devices provisioned to the network, and to provide that data to other devices. M2M Enablers may also provide facilities to trigger actuations on their network, enabling the disclosed system to effect some physical result in these external networks. The Platform module 104 treats the data coming from this source and going to an M2M network through the Platform Gateway (208, FIG. 2A) in the similar way in which it handles data coming from the Device Network module (204, FIG. 2A).

In the context of IoT applications that utilize the disclosed system, human observers are simply a specialized type of sensor that is aware of a person's inner state and requirements—such as a need for a pizza delivery—as well as other observable facts, such as the color of a certain test strip. Therefore, the disclosed system generalizes human, animal (and other organism), and sensor data as being created by a Resource, and processes such data in a uniform manner. Creating a general-purpose framework with multiple applications utilizes data normalization services so that the same Resource data could be used in multiple applications.

The disclosed system utilizes a high-speed data or message ingestion services with batch data processing and high-speed data processing of normalized data. For example, alerting of anomalous medical conditions and events in remote patient care; delivery of customized near real time offers to a shopper in a brick-and-mortar department store; and high-speed data security breach detection. All three of these previously unrelated appearing systems, as well as many more, can be realized using the disclosed system.

The Platforms module 104 comprises at least one gathering module wherein the data captured from the Resources module 102 is processed to make sense out of it. The Platform module 104 exposes the processed data as services or can generate events published to various applications that are subscribed to a particular event. At a very high level, the Platform module 104 can be organized into the following sub-components:

A Platform Gateway (GW) module (208, FIG. 2A): It is the entry point for data coming from the Resources module 102 to the Platform module 104 and acts as a bridge between the Resources module 102 and a Platform Core module (210, FIG. 2A). Its responsibilities include transforming the resource data to a Platform-specific format. It can perform some basic business functions (e.g., applying business rules, aggregation, etc.) on data before sending it across to the Platform Core module (210, FIG. 2A). This type of Gateway module (236, FIG. 2A) is a "Smart Gateway," which can be also utilized for edge caching. Gateway modules are also capable of connecting various networks with each other and representing them as a single network.

Gateway modules (236, FIG. 2A) are cloud based and can be accessed by the Resources module 102 via Controller modules (232, FIG. 2A) over unconstrained networks such as the Internet. Gateway modules may also send messages to Controllers. Gateway modules are typically deployed on a Wide Area Network (WAN) in a Demilitarized Zone (DMZ). However, the communication between the Gateway modules and the Platform Core module (210, FIG. 2A) may be on a secure network.

Controller modules (232, FIG. 2A) are typically deployed within a local wired or wireless Network and connect to Gateway modules (236, FIG. 2A) in order to reach the Platform module 104. The bi-directional communication between Gateway modules and Controller modules is secured by applying different encryption algorithms based on requirements. Controller modules typically perform the function of connecting a constrained network (networks with lower bandwidth such as Bluetooth) with an unconstrained network (networks with higher bandwidth such as Internet). Controller modules are sometimes referred as an "M2M Gateway" because they operate within the M2M space. The interaction of Controller modules with the devices is transparent to the Platform module 104 and in one example handled by the underlying resource network implementation.

Controllers are software programs realized on physical or virtual hardware devices. Devices (more generally Resources), including Sensors ("S") and Actuators ("A") and humans or other organisms (not shown), are connected in a wired or wireless fashion (or via another Device) to Controllers. Sensors detect or measure some condition, for example temperature or the presence or absence of some chemical, and produce a signal, for example a digital or analog electrical current, describing that condition. In response to a signal from Platform, Actuators effect some physical, chemical or other change in the environment around them, for example turning on a set of pixels on computer screen or turning a valve on or off. A novel aspect of our invention is that a human or other organism may also be considered a sensor or an actuator with respect to the Platform in the precise sense as any other actuator or sensor such as a mechanical, chemical or electrical device. From the point of view of the Platform, a sensor that may be human or other organism—for example, a trained animal—may detect and report aspects of his or her external environment, or his or her internal state such as "I am hungry", or "I want a pizza delivered". Similarly, a human or other organism may function as an actuator by effecting a change in his, her or its environment in response to Platform messages, for example "Pick up passenger at the following address", or "ring a bell". In concept, at some future time a mechanical or other automated device, for example a driverless car, could potentially perform the operations performed by a human or other organism acting as a sensor or actuator. The fact that for now these activities may be performed by a human or other organism does not limit the scope of the system. The term "Resource" describes actuators and sensors, as well as humans or other organisms performing as actuators or sensors in the context of the system.

Controllers collect, process and sometimes store data gathered from, or being transmitted by the Platform to, Resources. Controllers also disseminate commands to Actuators. Controllers may perform some local processing of the Resource data, including combining it with other Resource data and sending data to other Resources. For example, a light switch may be implemented as an on/off switch connected to a Controller, together with a light connected to the same or another locally connected Controller. In the absence of a connection to the Platform, the local Controller could by default execute logic to turn the light on and off in response to the switch. In the presence of a connection to the Platform, the Controller may use the more sophisticated processing capabilities of the Platform to determine the signal sent to the Actuator (the light bulb, in this example). This local processing capability is important in cases of loss of internet connectivity, for example. The Controller may implement some custom "If this then that" ("IFTTT") or other logic. In addition to the resiliency this provides in the event of connectivity issues to the Platform, this local processing helps in supporting the fog computing techniques for overall performance optimization of the solution by offloading on-necessary tasks from the Platform. Controllers may be connected to other Controllers.

"Smart Phone" and other Smart Devices such as tablets and wearables themselves contain a variety of sensors and actuators. They also provide many options for the connection of other external sensors and actuators to the smart device via wireless, wired or other connection types. One possible and common embodiment of a Controller is as software hosted by a smart device. The smart device, in turn, may connect to the Platform Gateway through the internet, to the internet through a telecom network, or by some other means, enabling a connection between the Controller instantiated on the smart device, and the Platform Gateway.

The Platform Core module (210, FIG. 2A): It is where the data coming from Gateway modules is authenticated, processed and from where the output is published. It contains the business logic of each tenant to be applied on their data. The system is a multi-tenant solution wherein all the incoming messages are mapped to their respective tenants by a Tenant Handler module (240, FIG. 2A) before passing it to a Message Handler module (242, FIG. 2A) for further processing. A complex event processor provides the system with the capability to aggregate, associate and otherwise interpret the incoming data based on business requirements, and to initiate appropriate events that trigger notifications and complex actions.

In one embodiment, the system is a multi-tenant solution wherein all the incoming messages are mapped to their respective tenants by the Tenant Handler module (240, FIG. 2A) before passing it to the Message Handler module (242, FIG. 2A) for further processing. The complex event processor provides the system with the capability to aggregate data from multiple devices and sources and apply logical algorithms to such data based on business requirements. Calculations performed by the complex event processor are driven by a software-based analytics model and may incorporate results produced by a Platform Analytics module (212, FIG. 2A) in order to supply context and meaning to the incoming data and resulting machine-based decision. Decisions and analytics produced by the Platform Analytics module (212, FIG. 2A) and the complex event processor are stored persistently, together with the results of decisions effected through actuators as determined by the related sensors. In such a manner, the system can "learn" from the outcome of past decisions, and therefore modify and optimize its own analytic models.

One example of a context-aware system embodiment is a home health-care system enabling an elderly couple to stay in their home longer, rather than be put in a long-term care setting. Among other inputs generated by the Resources module 102, activity and temperature sensors relay information from the home. As in prior solutions, these could be used to determine if the couple is active and moving around their house normally, and if the house is at a safe temperature—since fixed income patients often economize by turning off their heating or air conditioning. In the disclosed system, context is also considered—in this example, the context would include information on whether the couple is at home or away from home, and past usage and activity patterns both for these sensors and for other information. When the couple is home, the absence of activity from the activity monitors and an above or below healthy temperature reading can trigger a near-real time notification to a caregiver to visit the home and/or communicate immediately with the couple to ensure their well-being. In the disclosed system, however, the context as to whether or not the couple is at home is also considered, together with the couple's past behavior patterns. This eliminates many false alarms as compared to prior systems, and leads to a better quality of care. The context on whether or not the couple is at home and in distress is inferred by the disclosed system using a programmable data model, rather than as a simple non-contextualized response to the sensor input. The other contextual data considered to determine the actions triggered by the activity and temperature monitors may include other sensor data (e.g., the GPS location of one or more mobile or wearable devices associated with the customer, social media and/or calendar events, and/or machine learning by monitoring past behavior to identify anomalies). In other words, the disclosed system permits the consideration by means of a programmable data model of the context of the current sensor data to influence the immediate decisions.

The Platform Analytics module (212, FIG. 2A): It includes both real-time as well as batch analytics. The Platform Core module (210, FIG. 2A) provides the Platform Analytics module (212, FIG. 2A) component access to the raw data for analysis. The analytic data is provided to applications either through analytic services or data services. The architecture of the Platform Analytics module follows a lambda architecture pattern, which provides data needed to support real-time context aware decision-making.

The Platform Services module (214, FIG. 2A): These are the portal management and business services provided by the Platform module 104 to the end users. Service handlers deliver these services to the Applications module 106 in a stateless manner as remote procedure calls (RPC) and/or web services. Data service is a special service that the Platform module 104 exposes to the Applications module 106 that either needs large volumes of platform data such as batch analytics or a custom domain view of the platform domain objects.

The Applications module 106 comprises modules that are consumers of the data produced by the Platform module 104. The Applications module 106 can subscribe to events produced by the Platform module 104 so that they receive those events as and when generated. Platform module 104 services can be accessed by Applications module 106 either by invoking the public interfaces using remote procedure call (RPC) or by calling web services of the platform. The Applications module 106 can be categorized in the following example groups:

An Application Platform module (216, FIG. 2A) includes a Platform SDK module 223, a Message Listener module 221, a Workflow Processor module 225, a Workflow Management module 227, an Integration Bus module 229, an App Store module 231, an App Content Management module 233, a Persistence module 235, and an App Platform API module 237.

The Platform SDK module 223 is the way for the App Platform module 216 to interact with the Platform Core module 210. The Platform Core module 210 exposes certain functionalities and each operation needs to be authenticated, authorized, and managed. Access to the Platform Core module 210 is also be determined by these security facilities. The Platform SDK module 223 provides the programming interface that allows the App Platform module 216 to do its own processing without issues relating to compatibility with the Platform Core module 210, as long as all the functionality is written using the SDK. The platform SDK module 233 also provides the means by which an application drives Actuators in Device Network 204, External M2M Enablers 206, and Software Systems 202 through the Platform Gateway 208 and Controllers.

The Message Listener module 221 listens for events from the Platform Core module 210, and then routes the message to the correct workflow. These messages could be simple (e.g., temp >100° C.) but the workflow could be complex (e.g., based on the context, a fire engine and an ambulance could be ordered, or it could be a notification saying that water is boiling). The Message Listener module 221 may be used to advanced steps in a workflow requiring additional processing and/or inputs to proceed. For example, in a package delivery system, a package may be scanned in at a location having a GPS coordinate. However, if that package is in an incorrect location, then a new step in the workflow may be to reassign the package to a new distribution center to send it to the correct location. The Message Listener module 221 can therefore trigger a larger, more complex workflow.

The Workflow Processor module 225 is the engine that executes the workflows. Workflows are semantic algorithms and need a processor to convert them into actionable code. This processor does that job.

The Workflow Management module 227 is the engine that manages the versioning, storing and handling of workflows. As described above, the Workflow is a semantic algorithm that is stored as a document, and needs to be versioned, and managed.

The Integration Bus module 229 is all third party integrations that would need a layer where the Platform would integrate with the external party. This layer provides throttling, fault handling and other such mechanisms in order to ensure that downtimes with these external systems doesn't affect the operations of the Platform.

The "App Store" module 231 acts as a discovery mechanism for consumers and users of applications. It shows the available apps that end users can access based on the devices and needs they have.

The App Content Management module 233 shows content and renders it coherently across all sorts of devices and operating systems. The content is managed via the App Content management system.

The Persistence module 235 is the data store for each app. Each platform application, at provisioning/data modeling time, can decide what kind of persistent store they would like, such as an RDBMS, NoSql, newSQL, columnar, graphical, etc. A given platform application could also have polyglot needs with multiple types of persistent storage for different use cases.

The App Platform API module 237 is all of the workflows and persistence data stored and the functionality of the App Platform module 216 is available by a Micro Service API which is the App Platform API module 237. It is the external end point to be used by all to access the functionality within App SDK. The way for an App (239, 241, 243) to interact with the Platform where the authentication, authorization, and the how is already baked into the App SDK. Using the App SDK, the developer can build their apps quickly and efficiently. The App SDK gets the content from the App Content Management module 233, and then needs to render it on different systems. The Rendering engine is an engine that is built per system, so the App can render all capabilities properly on the system/device (e.g., for a given application there could be a iOS rendering engine, an Android rendering engine, a web rendering engine, etc.) The Apps (239, 241, 243) may access the Persistence module 235 to obtain needed information for a workflow. In some embodiments, the Apps (239, 241, 243) may send data, observations, and/or requests as a Resource of the Resources module 102. Accordingly, Apps (239, 241, 243) may provide inputs to the disclosed system (e.g., counting a number of items and inputting the number) as data gathering and the processing of this gathered data may provide context-aware results (e.g., taking remedial action to reduce a number counted) that can display on the Apps (239, 241, 243).

A Platform Management Portal module (218, FIG. 2A): Applications providing user interface to manage portal. These applications consume portal management services of Platform module 104.

A Notification System module (220, FIG. 2A): These systems subscribe to various events produced by platform in order to notify their interested users or any other systems of such events.

An Advanced Analytics module (222, FIG. 2A): Even though the Platform module 104 provides analysis of data, there may be cases where further analysis could be required to meet a business need; for example, reporting of business outcomes or notification of system anomalies. Applications that perform these type of advanced analytics are grouped under "Advanced Analytics" applications.

An Apps module (224, FIG. 2A): These are other general purpose apps that consume the services of Platform 104. They include, for example, can be mobile, web, and embedded apps. Conceptually, an "App Store" may host such apps and provide updates.

An Enterprise Systems module (226, FIG. 2A): Various enterprise applications such as Hospital Management, CRM, etc. can subscribe to various events produced by the Platform module 104.

Business Workflow Management: Events produced by the Platform module 104 can be consumed by Business Workflow tools to initiate or advance a specific workflow in their business process.

In one embodiment of the IoT system, "intelligence" may reside in the network or in the device itself. This "intelligence" imputes meaning to the data supplied by the sensors, and affects the decision on how to act on it. In one embodiment, the "intelligence" resides on the Internet (e.g., could computing). This embodiment is useful for certain inanimate objects that include sensory rather than thinking capabilities, as well as the ability to communicate what they are sensing to the Internet cloud. In one example, a coffee cup can include a heat sensor to measure how warm the coffee is, a pressure sensor to determine how full the cup is, and even connectivity and a power source (i.e., even in the absence of intelligence or computing power).

The "intelligence in the cloud" approach allows bringing together the input from many sensors, meaning more interesting and complex behaviors can occur. It also supports learning from past behaviors, and making correlations with other situations beyond those experienced by any particular device. For example, a system in the cloud can observe the behavior of many devices such as coffee cups to learn when people tend to refill them, based on how full and how warm a coffee cup is. The disclosed IoT system can then use this average information to service a new patron at a restaurant, for example. By keeping the end-point devices "dumb" (i.e., endowing them with sensors but not brains or intelligence), the disclosed system can also be rapidly changed and upgraded, without concern about upgrading potentially literally billions of end-points.

The computing devices and their intermediaries may directly create and act on meaningful data available through the Internet, autonomously and without human intervention. Inanimate objects, with computing devices, can communicate directly with each other, and reach out through the Internet to communicate with people.

In one embodiment, once an IoT application is launched, the location sensors associated with involved devices (i.e., the actual "things" being monitored such as mobile devices as in smart phones) are regularly broadcasting their location to a hosted "back end" system on the "Internet Cloud." The mobile device sends a message to a back-end application, indicating a geographic location (e.g., determined by the sensor in the phone) indicating a need for particular service.

When it receives such a request, the "back end" system then uses near-real time analytics to determine which service device is the best-fit to service the request (e.g., using geographic proximity, cost, response time). Some of this information may be computed on-the-fly, given the most recent information available. Other information is pre-computed on a scheduled basis, in batch mode.

Embodiments of the IoT system may be implemented in different ways. For example, one or more of the components of the disclosed system can be embedded, implemented as firmware, or described and implemented in hardware description language (HDL) and loaded onto (e.g., field-programmable gate array (FPGAs) or application-specific integrated circuit (ASIC)).

Further, one or more of the components of the disclosed system can comprise: (a) modules including software running on a computing device, (b) modules including software running on a visualized device, (c) modules including firmware loaded onto a specialized processor, (d) modules defined using a HDL and loaded into a programmable processor, (e) modules implemented by a purpose-built hardware component, and/or (f) modules implemented in other ways knows to those skilled in the art.

The device- and connection protocol-independent programmable software platform for deploying and hosting scalable analytically-based IoT applications is disclosed herein.

By eliminating the need to create the basic infrastructure required to deploy an IoT application, the disclosed system allows the deployment of a limited scale pilot in a new domain a matter of weeks, where previously this took six months or longer. By making an IoT application model-driven and eliminating much of the need for coding, the system disclosed herein allows for the rapid evolution of an IoT application, enabling both a rapid time to market but also rapid and regular improvements based on user feedback. This allows a higher quality solution to be deployed in less time for a lower capital investment.

The disclosed system addresses the commonality of technical needs across industries for a more powerful machine to machine ("M2M") type solution that also contained analytics capabilities as well as near real-time event processing. IoT—while a common buzzword—concrete differentiation from prior M2M or "telematics" solutions. The disclosed IoT system, in addition to traditional M2M capabilities, also provides (a) model-based analytics to provide "context-aware" near-real-time decision-making, and (b) the aggregation of "big" data from a variety of sources, including but not limited to sensor data. In order to create such a platform, the disclosed system overcomes the issues of using the same end-point sensor device in multiple application contexts, which required the disclosed device and application independent way of processing sensor data. As a result of the disclosed system, a software platform could be created enabling a new category of end-to-end IoT applications that are primarily model and data-driven, rather than custom-coded. This approach drastically lowers the cost of entry for new IoT solutions by allowing device and application developers to focus on the unique aspects of their solution rather than creating the basic infrastructure required to deploy a full end-to-end IoT application.

Prior solutions do not support the hosting of multiple end-to-end IoT applications that use the full power of modern bigdata and analytics technologies to make context-aware decisions using more than the immediately available sensor data.

Prior device and device connection portions of IoT solutions focused on optimizing their unique connection protocols, or on creating hubs that allowed various devices or protocols to talk to each other in a mesh-type configuration. By contrast, the disclosed system uses the device and sensor data in an essentially "over the top" (OTT) protocol-agnostic manner.

The disclosed system is able to treat device data in a protocol-agnostic manner in order to create a platform that could host multiple applications created at different times by different vendors and/or authors, who required permissioned access to the same pool and feed of sensor data. The disclosed system is able to synchronize the views between the Batch and Near Real-Time view generators so that events are not dropped or processed multiple times.

Near real-time view module (258, FIG. 2A) contains the recently processed data while batch view module (260, FIG. 2A) contains the analyzed historical data. To handle real-time queries, data from Real-time view and Batch View has to be merged (262, FIG. 2A) by the application for producing real-time output to the end user. However, to maintain the accuracy of data, once the Batch View Generator generates batch views for a portion of data in near real-time view, that portion of data needs to be purged from the real-time view as it has been overridden by the batch view. If this is not done, then query output may have duplicate data coming from both the views.

For example, if near real-time views store the data for one day, then the batch view may store the historical data till one day before. The processing time of the real time data is short, but generating batch views may take a longer time. If a batch view begins to be built at time X of a day and it takes Y minutes to finish the job, then the near-real time view provides the data till X+Y times of day. But, as soon as recent batch view is made operational, then the data till X time of day shall be purged, otherwise the disclosed system will have duplicate data being processed and served to the end users. Purging the data from near real-time view too can take a certain amount of time, so any query served by the near real-time view at that moment can contain data that is already served by batch-view by now. To avoid this race condition, two real-time views may be maintained, but at any given point of time only one real-time view may be operational. These views may be purged alternatively and swapped to take each other's place after each batch run. As near-real-time views are for very short duration (e.g., a few seconds, hours, or days), storage overheads can be optimized to be negligible with respect to overall storage needs of such "big data" platforms.

Resources such as sensors 108 gather data and/or make requests. Manually entered and automatically gathered sensor observational data and requests 110 are reported to the Platform module 104 as messages, using a secure protocol. These messages may include human observations (e.g., the currently observed status of a traffic accident), and/or a human-initiated request (e.g., a need for 911 emergency services). It may also include automated sensor data (e.g., the temperature of a refrigerated truck).

Figure 2A:
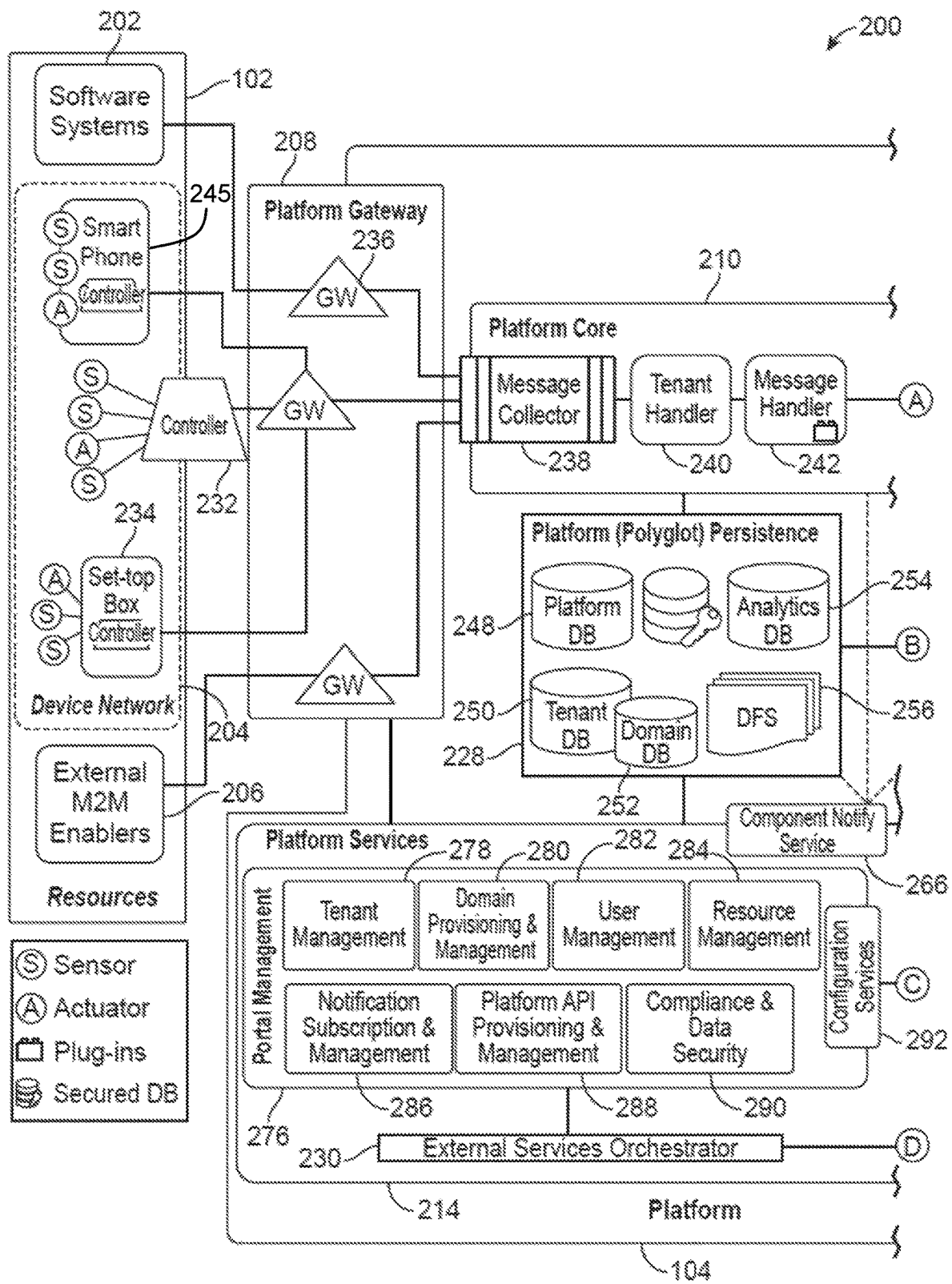
FIG. 2A shows an exemplary high-level architecture diagram and process.
Figure 2A:
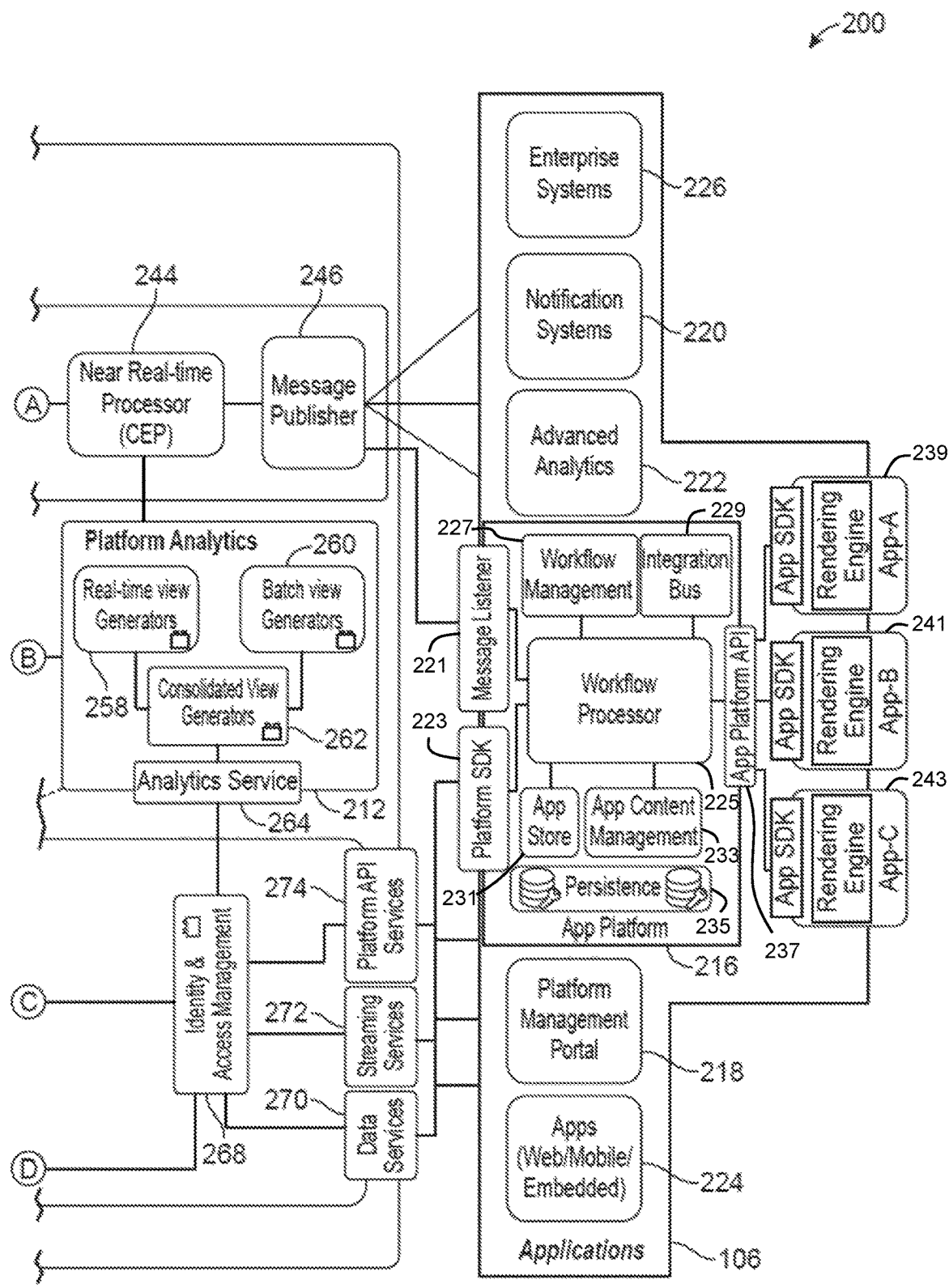

Resources such as sensor data are conveyed to a controller that, in turn, connects to a Gateway module (236, FIG. 2A). The sensor may transmit such data through various means, including a physical wired serial connection, a wireless connection such as Bluetooth, and other means. A controller may also be physically integrated into a sensor, and in that sense a sensor may connect directly to a Gateway module. However the sensor and the controller are logically separate, and may also be physically separate (e.g., multiple sensors may be connected via wires carrying RS232 serial information, with these wires physically to a common controller device). The controller is able to transmit the data it receives from one or more sensors to the Gateway module in various ways, including multiplexing such data, transmitting it sequentially in bursts or packetizing such data. Controller modules (232, FIG. 2A) are typically deployed within a local wired or wireless network to which a set of sensors are logically or physically connected. Controller modules typically perform the function of connecting a constrained network (i.e., networks with lower bandwidth such as Bluetooth) with an unconstrained network (i.e., networks with higher bandwidth such as Internet). One or more Controller modules may be connected to the same Gateway module. The communication between Gateway modules and Controller modules is secured by applying different encryption algorithms based on requirements. Gateway modules are typically cloud based or deployed on physical or virtual systems, though they may be deployed on the same network or even the same device as the Controller module. The Controller module may access one or more Gateway modules, though typically a single Gateway module, over an unconstrained network such as the Internet. Gateway modules are typically deployed on WAN (Wider Area Network) in a DMZ (Demilitarized Zone). However, the communication between the Gateway module and the Platform Core module (210, FIG. 2A) is assumed to be on a secure network.

The message processing system on the platform receives the observational data and requests 110 asynchronously, via a Gateway module interface.

The Gateway module (236, FIG. 2A) abstracts out device- and communication protocol-specific information using a data transformation engine programmed by a resource adaptor. Gateway modules also may be configured on a per-application or shared-application basis to access external software resources—for example, existing enterprise resource planning (ERP) systems or other sources of data—and other external networks of devices. This flexibility allows layering application functionality on top of third party proprietary networks of devices, with appropriate permissions.

The Platform Gateway (208, FIG. 2A) is the entry point for data coming from the Resources module 102 to the Platform module 104 and acts as a bridge between resources (e.g., such as sensors) connected to controllers, and the Platform Core module. Its responsibilities include transforming the resource data to a Platform-specific format. It can perform some basic business functions (e.g., such as applying business rules, aggregation, etc.) on data before sending it across to Platform Core module. Such type of Gateway module is called "Smart Gateway" which can be also utilized for edge caching. Gateway modules are also capable of connecting various networks with each other and representing them as a single network.

The Gateway module incorporates a software "plug in" that is capable of understanding the binary or other information originated by a particular type of resource, and translating such information into a self-describing schema format such as but not limited to AVRO. A single Gateway module is typically able to recognize and translate the information for multiple types of resources.

An example of a general resource agnostic data schema in AVRO format can be as follows:

```
@namespace("com.globallogic.goliath.model")
protocol DataInterchangeProtocol {
    record KeyValueObject {
        union{null,boolean, int, long, float, double, bytes, string} name; //can be of any one of them mentioned in union.
        union {boolean, int, long, float, double, bytes, string, KeyValueObject, array<KeyValueObject>} value;
    }
    record Datum {
        union {boolean, int, long, float, double, bytes, string, KeyValueObject, array<KeyValueObject>} value;
    }
    record ResourceMessageContext{
        string rmVersion;
        string sequence;
        string resourceGUID;
        string GWID;
        string GWTimestamp;
    }
    record ResourceMessage {
        ResourceMessageContext context;
        union {bytes,array<bytes>} data;
    }
    record TenantMessageContext{
        union {null,string} tenantID =null;
        union {null,string} tenantName = null;
        union {null,string} rmVersion = null;
        union {null,string} sequence = null;
        union {null,string} resourceGUID = null;
        union {null,string} GWID = null;
        union {null,string} GWTimestamp = null;
    }
    record TenantMessage {
        TenantMessageContext context;
        union {bytes,array<bytes>} data;
    }
    record Error {
        int code;
        string message;
    }
    record Status {
        int code;
        string message;
    }
    record PlatformMessage {
        string resourceGUID;
        string GWID;
        string timestamp;
        Status status;
        union {Datum, array<Datum>} data;
        union {null, array<Error>} errors = null; //optional
    }
    enum EventType {
        ALERT,
        NOTIFY
    }
    record EventSource {
        int resourceId;
        string timeOfOrigin;
        array<string> rules;
        union {Datum, array<Datum>} data;
    }
    record EventMessage {
        string EMID;
        EventSource source;
        string timestamp;
        EventType type;
        string code;
        union{null,string} message = null;//optional
    }
    void send(array<ResourceMessage> 1stResourceMessage, string messageCollectorURL, string channelName);
    array<PlatformMessage> receive(array<ResourceMessage> 1stResourceMessage, string messageCollectorURL, string channelName);
}
```

An example consolidated message from various sensors may be:

```
{
    "context": {
        "rmVersion": "1.0",
        "sequence": "00001",
        "resourceGUID": "TruckKA03HU8866",
        "GWID": "tenant02gw01",
        "GWTimestamp": "2015-03-12T13:24:00.234Z"
    },
    "data": [
        {
            "temperature": 30.1,
            "speed": 60.2,
            "latitude": 12.58,
            "longitude": 77.35,
            "timestamp": "2015-03-12T13:24:00.234Z"
        },
        {
            "temperature": 20,
            "speed": 40,
            "latitude": 20.45,
            "longitude": 40.78,
            "timestamp": "2015-03-12T13:24:00.234Z"
        }
    ]
}
```

The processed observational data and request messages are stored by the Platform module 104 for archival purposes and later processing. A historical data module 112 and an external federated data module 114 may provide data to a deep insights module 116.

In parallel to the incoming messages being stored, the abstracted observational data and requests are streamed to and processed by the "Fast Decision Making" module 118 of the platform, also described in more detail as the Platform Core module (210, FIG. 2A). This near real time processing component processes the incoming message stream at high speed using an analytic model that is created for each application. This model makes reference to the view information made available by the component labeled Platform Analytics module (212, FIG. 212) and/or the Deep Insights module 116. The reference to these views provides a facility by which the model may incorporate the required context awareness to the fast decision-making process.

An analytic model may be illustrated as an example of warehouse management. Flexibility in warehouse management becomes critical in e-commerce because of unpredictability of demand. So, a warehouse management solution has to provide real-time, accurate inventory and order visibility, efficient warehouse space management and identifying the fastest and slow moving items.

The probable solution using the disclosed system could be attaching each item in the warehouse with a RFID sensor. The system build using given architecture collects the data from each item that enters and leaves the warehouse using RFID sensors. The data collected can be product info, category, etc. In this illustration we will build a model to find fast and slow moving items from the warehouse by following the steps given below:

First, create Data Models in AVRO format, such as:

```
product.avsc
{
    "namespace":"com.globallogic.db.model",
    "type":"record",
    "doc":"This Schema describes about Product",
    "name":"Product",
    "fields":[
        {"name":"product_id","type": "long"},
        {"name":"product_name","type": "string","doc":"This is the name of the product"},
        {"name":"product_description","type": ["string", "null"], "default": ""},
        {"name":"product_status","type": {"name":"product_status", "type": "enum",
    "symbols": ["AVAILABLE", "OUT_OF_STOCK", "ONLY_FEW_LEFT"]},
    "default":"AVAILABLE"},
        {"name":"product_category","type":{"type": "array", "items": "string"}, "doc": "This contains array of categories"},
        {"name":"price","type": "float"},
        {"in_time":"time","type": "timestamp"},
        {"out_time":"time","type": "timestamp"},
        {"name": "product_hash", "type": {"type": "fixed", "name": "product_hash", "size": 5}}
    ]
}
```

Second, define Analytical models for the queries. An example for a top moving product analytical query is as follows:

```
top_N_items = Limit (function (timeSpent= timespent( item ,time) ByItem), N)
    Orderby ([timeSpentByItem])
N- no. of items to be limited in the query
```

Third, define the workflow for the end solutions. An example for a workflow node would be sending an e-mail alert when the average time spent is greater than configured threshold.

```
Condition: timeSpent > thresholdTime
Action: sendEmail ( ) {// Sends an e-mail to the configured subscribed set of customers
    }
Email.json
{
    "type": "object",
    "properties": {
        "name":    { "type": "string" },
        "email":   { "type": "string" },
        "address": { "type": "string" },
        "telephone": { "type": "string" }
    },
    "required": ["name", "email"]
}
```

By configuring the above data model, analytical model, and workflow definition in the configuration file, the system disclosed herein would automatically provision itself and execute the workflow in runtime.

An example workflow definition is as follows:

```
<Configuration Version=" ">
    <WorkflowConfiguration>
        |
        <Tenant Id="1001">
        |    <Workflow Identifier="59AC8810-8E9D-465C-8099-1FB24536D582" Name="Patient-Details-Workflow" Version="1.0"
            MessageType="PatientDetails" ConfigurationFileToLoad=" " />
```

```
  </Tenant>
  <TenanId Id="1002">
    |   <Workflow Identifier="C884CC08-342E-4C6B-B6EE-80315F46FE02" Name="Patient-Details-Workflow" Version="1.0"
        MessageType="PatientDetails" ConfigurationFileToLoad=" " />
    |   <Workflow Identifier="2121AD7F-4D54-47AD-AEE7-47629F48A4D4" Name="Update-Patient-Workflow" Version="1.0"
        MessageType="UpdatePatient" ConfigurationFileToLoad=" " />
  </TenanId>
</WorkflowConfiguration>
<QueuesConfiguration>
  <RequestQueueEndpoint QueueName="RequestQueue" QueueEndpoint="QCL-RequestQueue" />
  <NotificationQueueEndpoint QueueName="NotificationQueue" QueueEndpoint="QCL-NotificationQueue" />
</QueuesConfiguration>
<CacheConfiguration defaultExpirationTimeInMS="86400000" HostName="127.0.0.1" Port="6379" Password="foobared">
</CacheConfiguration>
</Configuration>
```

TABLE A

Sample Orchestration Configuration XML File

| Document tags | Attribute | Description |
|---|---|---|
| Configuration | | Root Tag for the Orchestration/Workflow Configuration. |
| | Version | Version number of the configuration file. |
| WorkflowConfiguration | | Parent tag for the workflow configurations for tenants. |
| Tenant | | Parent tag for the tenant specific workflow configurations. |
| | Id | TenantId of the tenant. |
| Workflow | | Parent tag for a workflow configured under tenant. |
| | Identifier | Unique Identifier for the workflow specified by using a GUID. |
| | Name | Short name to identify the worker. |
| | Version | Version number of the workflow configuration to be loaded. |
| | MessageType | Message Type that the workflow configuration will cater to. |
| | ConfigurationFileToLoad | File Path of the workflow configuration XML to be loaded. |
| QueuesConfiguration | | Parent tag for specifying the queues related configuration. |
| RequestQueueEndpoint | | Request Queue details from where the request will be read by the orchestration manager. |
| | QueueName | Short name for the request queue. |
| | QueueEndpoint | Queue-Endpoint of the request queue where the requests will be sent by the API layer and read by the orchestration manager. |
| NotificationQueueEndpoint | | Notification Queue details where the response notifications will be sent. |
| | QueueName | Short name for the notification queue. |
| | QueueEndpoint | Queue-Endpoint of the response notification queue where the requests will be sent by the orchestration manager and read by the API layer. |
| CacheConfiguration | | Parent tag for cache configuration details. |
| | defaultExpirationTimeInMS | Default Cache Expiration time in milliseconds. |
| | HostName | Hostname/IP of the cache server instance. |
| | Port | Port number of the cache server instance. |
| | Password | Password for the cache server instance. |

Workflow Configuration File Structure:

```
<Workflow Identifier="59AC8810-8E9D-465C-8099-1FB24536D582" Name="Patient-Details-Workflow" TenantId="1001" Version="1.0"
    MessageType="PatientDetails">
    <WorkflowStep Identifier="E8CB6A62-6590-4F9B-8546-6D79486ED33E" Name="Fetch-Permissions" Async="true" DependentStep=" "
    Action="QCL.Worker.Permissions" ExpectedTimeToExecuteInMs="50" WorkerQueueEndpoint="QCL-WorkerQueue-Permissions">
        <Rules>
            <Rule Id="Rule-001" Description="Rule-Permissions" TaskToExecuteOnSuccess="CAA80C20-B270-411B-A6E5-769E51EBA2EC"
            TaskToExecuteOnFailure="2121AD7F-4D54-47AD-AEE7-47629P48A4D4">
                <Parameter Name=" " Value=" "></Parameter>
                <Parameter Name=" " Value=" "></Parameter>
            </Rule>
        </Rules>
    </WorkflowStep>
    <WorkflowStep Identifier="CAA80C20-B270-411B-A6E5-769E51EBA2EC" Name ="Patient-Details" Async="false" DependentStep"
    "E8CB6A62-6590-4F9B-8546-6D79486ED33E" Action="QCL.Worker.Patient" ExpectedTimeToExecute="50" WorkerQueueEndpoint=
    "QCL-WorkerQueue-Patient">
        <Rules></Rules>
    </WorkflowStep>
```

TABLE B

Sample Workflow Configuration XML File

| Document tags | Attribute | Description |
|---|---|---|
| Workflow | | Root Tag for the workflow configuration file. |
| | Identifier | Unique Identifier for the workflow specified by using a GUID. This will be same as the one specified in the Orchestration/Workflow configuration. |
| | Name | Short name for the workflow. |
| | TenantId | TenantID for which this workflow will be applicable. |
| | Version | Version number of the workflow configuration file. |
| | MessageType | Message Type that the workflow configuration will cater to. This is same as the one specified in the orchestration manager configuration for the workflow. |
| WorkflowStep | | Parent tag for the workflow steps configured under a workflow. |
| | Identifier | Unique Identifier for the workflow step specified by using a GUID. This will be used to uniquely identify the step within the workflow. |
| | Name | Short name of the workflow step. |
| | Async | Whether the step can be executed async or not. Valid values = True/False |
| | DependentStep | GUID same as Identifier which will define whether the current step has any dependency on another step before getting executed. |
| | Action | The actual worker to be invoked for execution. |
| | ExpectedTimeToExecute | Expected time that should be taken by the worker to complete execution. |
| | WorkerQueueEndpoint | Worker queue endpoint where orchestration manager will send the request to. |
| Rules | | Parent tag for rules defined on specific step. |
| Rule | | Individual rule tag |
| | Id | Rule ID |
| | Description | Short description of the rule applied. |
| | TaskToExecuteOnSuccess | The GUID/Identifier of the Step or a workflow that will be invoked upon success of the rule execution. |
| | TaskToExecuteOnFailure | The GUID/Identifier of the Step or a workflow that will be invoked upon failure of the rule execution. |
| Parameter | | Parameters that the rule is expecting as input. |
| | Name | Parameter name. |
| | Value | Parameter Value. |

App.config:

XML file specific to each worker. This has configurations for cache, data access layer and worker queue endpoints. Sample configurations are listed below:

| Sections | Remarks |
|---|---|
| WorkerQueueEndpoints | Configuration section for the worker named queue. |
| DBConnectionString | Data access configuration. |
| CacheConfiguration | Configuration section for Cache. |

Sample xml:

```xml
<configuration>
  <configSections>
    <section name="WorkerQueueEndpoints" type="QCL.POC.WorkerApp.WorkerQueueEndpointsHandler, QCL.POC.WorkerApp"/>
    <section name="CacheConfiguration" type="QCL.POC.Utilities.Caching.CacheConfiguration, QCL.POC.Utilities.Caching"/>
  </configSections>
  <appSettings>
    <add key="DBConnectionString" value="SERVER=localhost;DATABASE=qcl_poc;UID=root;PASSWORD=XXXXX;"/>
  </appSettings>
  <WorkerQueueEndpoints QueueId="1" WorkerIdentifier="PatientWorker" QueueEndpoint="POC-QCL-WorkerQueue-Patient">
  </WorkerQueueEndpoints>
  <CacheConfiguration defaultExpirationTimeInMS=" 86400000" HostName="127.0.0.1" Port="6379" Password="XXXXX">
  </CacheConfiguration>
</configuration>
```

An application is a use case. The end result of the use case is generally to produce some action (e.g., triggering an actuator to unlock a door), notification (e.g., notifying a caregiver or first responder of an emergency condition), to advance the state of a workflow (e.g., to initiate a shipment), to store data or intermediate results, or to cause some other activity or effect. Resources supply the inputs into the application; for example, these resource inputs may be end-user requests, or sensor data. The application use case employs the programmed analytic model to determine how to combine the resource data with contextual data, and with low latency causes some result. A given resource and a given instance of data produced by that resource may participate in multiple applications. For example, a measurement from a particular connected weight scale may be used by a care co-ordination application to conduct remote patient monitoring for post-operative recovery, while the same weight measurement from that same device (e.g., a sensor resource) may simultaneously be used by a fitness application to deliver social support or gamification points. An application is potentially embodied in a set of analytic models, a set of gateway device plug-ins, as well as a set of web and mobile applications that directly interact with end users both to gather (i.e., with users as resources) and present data.

Based on the results of the "Fast Decision Making" module 118 analysis, an immediate action module 120 may be triggered, or a more complex workflow module 122 may be either initiated or advanced. Immediate actions may including the triggering of physical actuators 124 (e.g., the remote unlocking of a car or house door), be realized as an alert, and/or a notifications to users (e.g., a pop-up notification on a mobile device).

The Applications module (106, FIG. 2A) provides a facility for responding to immediate action requests and complex workflow requests initiated by the Fast Decision Making module 118 and/or Platform Core module (210, FIG. 2A). This module may also be triggered by and return data to the Platform Services module (214, FIG. 2A). The connection to the Platform Core module (210, FIG. 2A) enables the applications to access and store batch and other analytic results, context data, and/or other data obtained from end users and other sources. The Applications module 106 also provides facilities for connecting the Platform module 104 as a whole with end-user facing applications realized as mobile, web, and/or desktop applications.

The Platform Analytics module (212, FIG. 2A) and Platform Persistence module (228, FIG. 2A) implement the "batch" components of the "Lambda" architecture. These make available processed model-driven intermediate to the "Fast Decision Making" module 118 and/or Platform Core module (210, FIG. 2A) in order to provide context to the fast decisions described above.

In addition to accessing external sources of information through the Gateway layer as described above, the External Services Orchestrator (230, FIG. 2A) module of the Platform Services module (214, FIG. 2A) supports data federation from external sources of information through their API's, directly from databases or queries, or other sources of external information access. This allows such data to be incorporated into models hosted by the "batch" data process layer described above, making such data available to applications and to the fast decision layer.

Components 126 of FIG. 1 correspond to the Resources module (202, FIG. 2A), the Controller module (232, FIG. 2A), the Set-top box (234, FIG. 2A), the smart phone (245, FIG. 2A), External M2M enablers (206, FIG. 2A), the Device Network (204, FIG. 2A), human input, and organism input. Component 128 of FIG. 1 corresponds to the Platform Gateway module (208, FIG. 2A) and the Gateway (236, FIG. 2A). Components 130 of FIG. 1 correspond to the Polyglot (Persistence) module (228, FIG. 2A). External Federated Data 114 corresponds to the External Services Orchestrator module (230, FIG. 2A). Component 132 of FIG. 1 corresponds to the Real-time View Generator module (258, FIG. 2A) and the Consolidated View Generator module (262, FIG. 2A). Component 134 of FIG. 1 corresponds to the Message Publisher module (246, FIG. 2A). The Immediate Actions module 120 of FIG. 1 corresponds to the Notification Systems module (220, FIG. 2A), the Enterprise Systems module (226, FIG. 2A), and the Advanced Analytics module (222, FIG. 2A). The Complex Actions module 122 of FIG. 1 corresponds to the App Platform module (216, FIG. 2A).

FIG. 2A shows an exemplary high-level architecture diagram 200. Reference characters A, B, C, and D are used to show connections within FIG. 2A. The Resources module 102 includes one or more controller modules 232. The controller modules 232 are the software programs that collect, process and store the data gathered from, or being transmitted by the Platform module to the Resources module to implement some custom IFTTT or other logic before sending to platform in the cloud. It helps in supporting the fog computing techniques for overall performance optimization of the solution. It can have a set of sensors and actuators connected to it or may be connected to other Controllers.

The Resources module 102 may include one or more Set-top box modules 234. Set-top box modules 234 may be used to host Controllers. Sensors and Actuators may connect to the set-top box via wireless, wired and other means, and human users acting as sensors and actuators may interact with the controller using a remote control or similar device. The Controller, in turn, may use the set top box's connection mechanisms to communicate to the Platform Gateway via wired cable, satellite uplink, wireless internet, or other means.

The Resources module 102 may include one or more External M2M Enablers modules 206. These are third party service providers that enable an M2M or other IoT network. These M2M and IoT enablers provide services and interfaces to access the data captured from the devices provisioned on those networks; they may also provide access to actuators hosted on their network. The Platform may ingest sensor data from and transmit actuator data to these third-party providers via the interfaces they provide. The Platform handles the data coming from these sensors and transmitted to these actuators in the same way as it handles data coming from devices and sent to actuators directly connected to the system through Gateways.

The Platform module 104 includes a platform gateway module 208 that may include one or more gateway (GW) modules 236. The Gateway module 236 is the entry point for data coming from Resources to the Platform and acts as a bridge between Resources and Core Platform. Its responsibilities include transforming the Resource Data to Platform specific format (Message). Gateway can perform some basic business functions (such as applying business rules, data aggregation, etc.) on data before sending it across to core platform. Such type of Gateway is called "Smart Gateway" which can be also utilized for edge caching. Gateways are capable of connecting various networks with each other and representing them as a single network.

The Platform module 104 includes a Platform core module 210. The Platform core module 210 includes a message collector module 238, a tenant handler module 240, a message handler module 242, a near real-time processor (CEP) module 244, and a message publisher module 246.

The Message Collector module 238 is responsible for collecting the messages from the Gateway and forwarding it for further processing. It is a multi-consumer queue implementation with consumers (Tenant Handler) capable of handling very large stream of data at low latency. It is in this module where the Message is sent to Platform Persistence for storage.

The Tenant Handler module 240 is responsible for processing each Message captured by Message Collector to abstract tenant information and send it to respective Message Handler of the tenant.

The Message Handler module 242 is where the Message is processed for applying business logic. The output of Message Handler is a business object that is passed to Platform Persistence for storage. It is input to the Near Real-time processor The Near Real-time Processor (CEP) module 244 applies the pre-defined business rules on the business objects pushed into it by Message Handler. Events can be generated by the Near Real-time Processor based on the configured business rules. These events are passed to the Message Publisher.

The Message Publisher module 246 is based on pub-sub ("publish-subscribe") model. It publishes the events generated by the Near Real-time Processor to the subscribers of those events.

The Platform module 104 includes a Platform (Polyglot) Persistence module 228. The Platform (Polyglot) Persistence module 228 includes a platform DB 248, a tenant DB 250, a domain DB 252, an analytics DB 254, and a DFS 256.

The Platform DB 248 stores the data which is exposed through the services by the Platform. This is the processed data of the various components of the Platform.

The Tenant DB 250 consists of the data that is very specific to tenants of the Platform. It can contain the configurations of the tenants, etc.

The Domain DB 252 contains the data that is related to configuration of domains to the platform such as domain model, data mapping tables, etc.

The Analytics DB 254 is the processed data of the Platform Analytics component. It is the most valuable data in terms of business.

The DFS (Distributed File System) 256 is generic file storage system of the Platform. It helps Platform to have a reliable fault tolerant access to its data in files.

The Platform module 104 includes a Platform Analytics module 212. The Platform analytics module includes a real-time view generator module 258, a batch view generator module 260, a consolidated view generated module 262, and an analytics service module 264.

The Real-time View Generator module 258 processes and analyzes the stream of business objects sent by the Message Handler in the real time to generate low latency views. Emphasis should be on incremental computation of the views in this pipeline in order to minimize the latency of the output views. The views are loaded in in-memory and subsequently updated to get near real time access.

The Batch View Generator module 260 produces high latency batch views on the master data stored in Platform Persistence component. It shall re-compute the complete view from scratch which helps in removing the errors if any occurred during the computation of previous batch.

The Consolidate View Generator module 262 combines the views from Real-time View Generator and the Batch View Generator in order to produce a single real-time view of the data.

The Analytics Services module 264 is the module through which the data produced by the Consolidate View generator is exposed as business services by the Platform.

The Platform module 104 includes a Platform Services module 214. The Platform services module includes a Component notify service module 266, an Identity & Access Management module 268, a data services module 270, a streaming services module 272, a platform API service module 274, and a portal management module 276.

The Component Notify Service module 266 is a notification system for inter component communication within the Platform. It notifies any changes in the state of a component to other components if they have subscribed for that state change. This component makes the Platform dynamic to the changes in the system.

The Identity & Access management module 268 stores the authentication and authorization data of the users of the Platform. It also performs the authentication and authorization checks for all the users who use the Platform.

The Data services module 270 can be used to provide the direct access to the Platform data. Applications can be interested in the direct access of processed data of the Platform.

The Streaming services module 272 provides real time streaming of processed data to Applications, which is done using Data Services.

The Platform API services module 274 are the business services provided by the Platform.

The Portal Management module 276 includes a tenant management module 278, a domain provisioning & management module 280, a user management module 282, a resource management module 284, a notification subscription & management module 286, a platform API provisioning & management module 288, a compliance & data security module 290, and a configuration services module 292.

The Tenant Management module 278 is for provisioning, configuring and managing the tenants of the Platform.

The Domain Provisioning & Management module 280 is related to provisioning the domain model, methods and services.

The User Management module 282 is for managing the uses of the Platform.

The Resource Management module 284 can contain sensors, actuators, devices, external M2M enablers or other Software Systems. This module is responsible for managing all of them.

The Notification Subscription & Management module 286 manages the subscription of events generated by Platform. Platform generates events based on the analyzed data and the business rules.

The Platform API Provisioning & Management module 288 manages the various APIs provided by the Platform.

The Compliance & Data Security module 290 provides all the information on the compliance of Platform to various regulations such as HIPAA, etc. and also stores the various configurations and algorithms for the same. These algorithms are processed by the platform at different states to ensure the compliance to a given regulation.

The Configuration Services module 292 provides the mechanism to store, retrieve and update the various configurations that are required for the running of the Platform.

The Applications Module 106 includes the App Platform module 216, the Platform Management Portal module 218, the Notification Systems module 220, the Advanced Analytics module 222, the Apps (Web/Mobile/Embedded) module 224, and the Enterprise Systems module 226.

The Platform Management Portal module (218, FIG. 2A): Applications providing user interface to manage portal. These applications mostly consume portal management services of Platform module 104. These consists of three portals/applications of their own which are: platform management, workflow designer, and app creation engine. Platform Management is where the Platform module 104 users can go and do their platform management tasks such as billing, creation of analytic models, and creation of embedded models. They can also control which other users can access this portal as well as review the usage of their app. Workflow Designer is where authorized users can come and create their workflows which are being used in their apps. App Creation Engine is where authorized users can come and create their screens and see how the created screen looks in all platforms such as LCD panel, smart watch, phone, browser, etc.

The Notification System module (220, FIG. 2A): Externally deployed systems may be subscribe to various events produced by platform in order to notify their interested users or any other systems of such events. These systems may use proprietary third party notification systems of companies such as Google, Apple, and Microsoft, in order to allow the disclosed system to interact and send notifications to such external systems.

The Advanced Analytics module (222, FIG. 2A): Even though the Platform module 104 provides analysis of data, there may be cases where further analysis could be required to meet a business need; for example, reporting of business outcomes or notification of system anomalies. Applications that perform these type of advanced analytics are grouped under "Advanced Analytics" applications.

The Apps module (224, FIG. 2A): These are other general purpose apps that consume the services of the Platform module 104. They can be, for example, mobile, web or embedded apps. An "App Store" may allow discovery and access to such type of apps. The Platform module 104 may be accessed Data Services 270, Streaming Services 272, or Platform API services 274 by apps. This is similar to the smartphone apps which is a way into the smartphone ecosystem. Similarly, these apps could be installed on a phone, on a refrigerator, on a smart watch, and for purposes of example may be broadly divided into three categories: on the web, on the mobile, and on embedded. On the web is basically the Platform Management Portal module (218, FIG. 2A) apps, but an app could also have a web portion. On the mobile is similar to smartphone apps (e.g., Android or iPhone apps), mobile apps cater to smart phones, smart watches and tablets. On Embedded, since this is an IoT Platform, the "things" could themselves also have an app in them, and these embedded apps are meant to be these apps.

The Enterprise Systems module (226, FIG. 2A): Various enterprise applications such as Hospital Management, CRM, etc. can subscribe to various events produced by the Platform module 104. These are external enterprise systems that the Platform module 104 interacts with. Examples of such systems include, e.g., the system of record for insurance details, truck details, and government resources (e.g., drivers license, SSN).

Figure 2B:
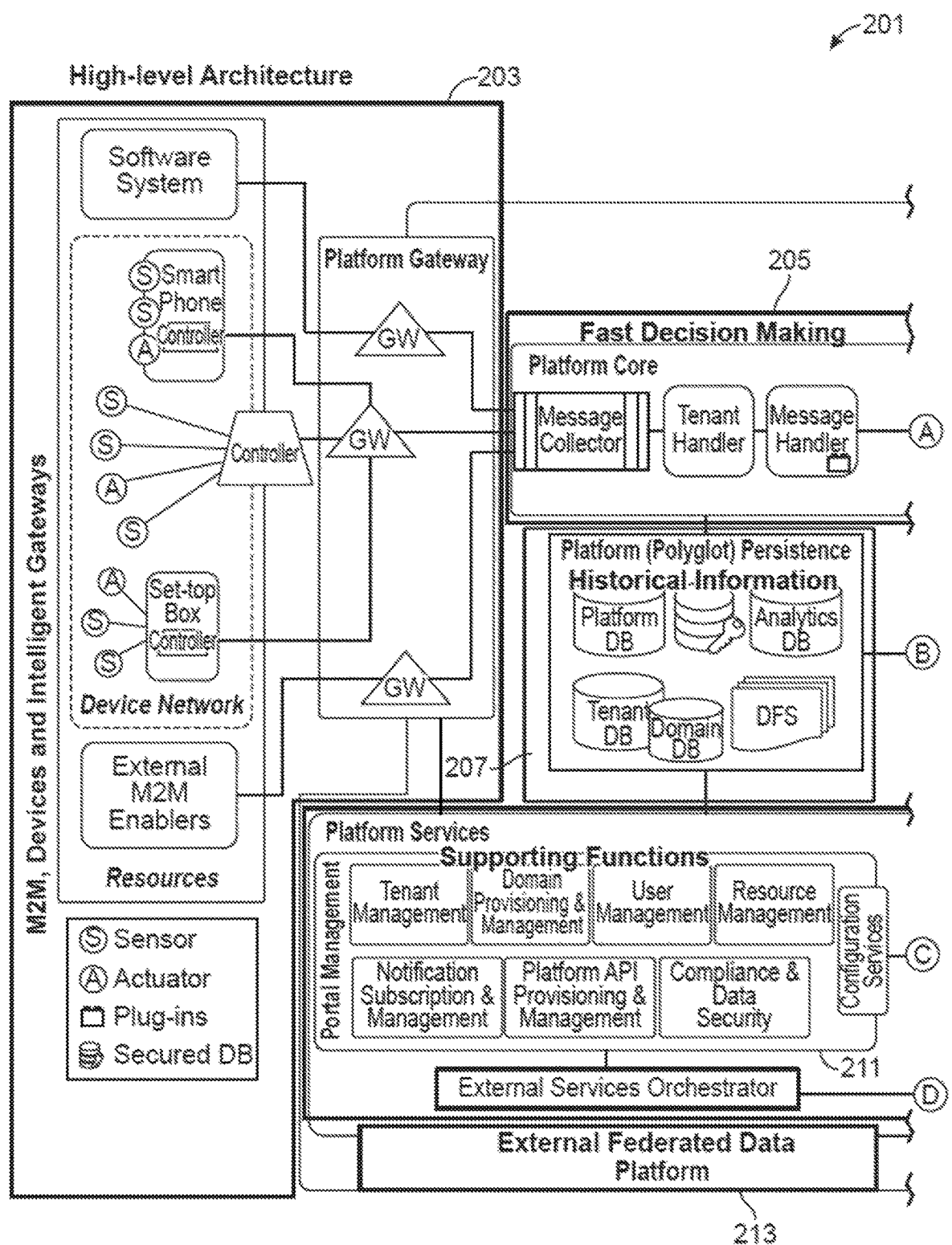
FIG. 2B shows an exemplary high-level architecture and process showing the correlation between the functions in FIG. 1 and the implementation in FIG. 2A.
Figure 2B:
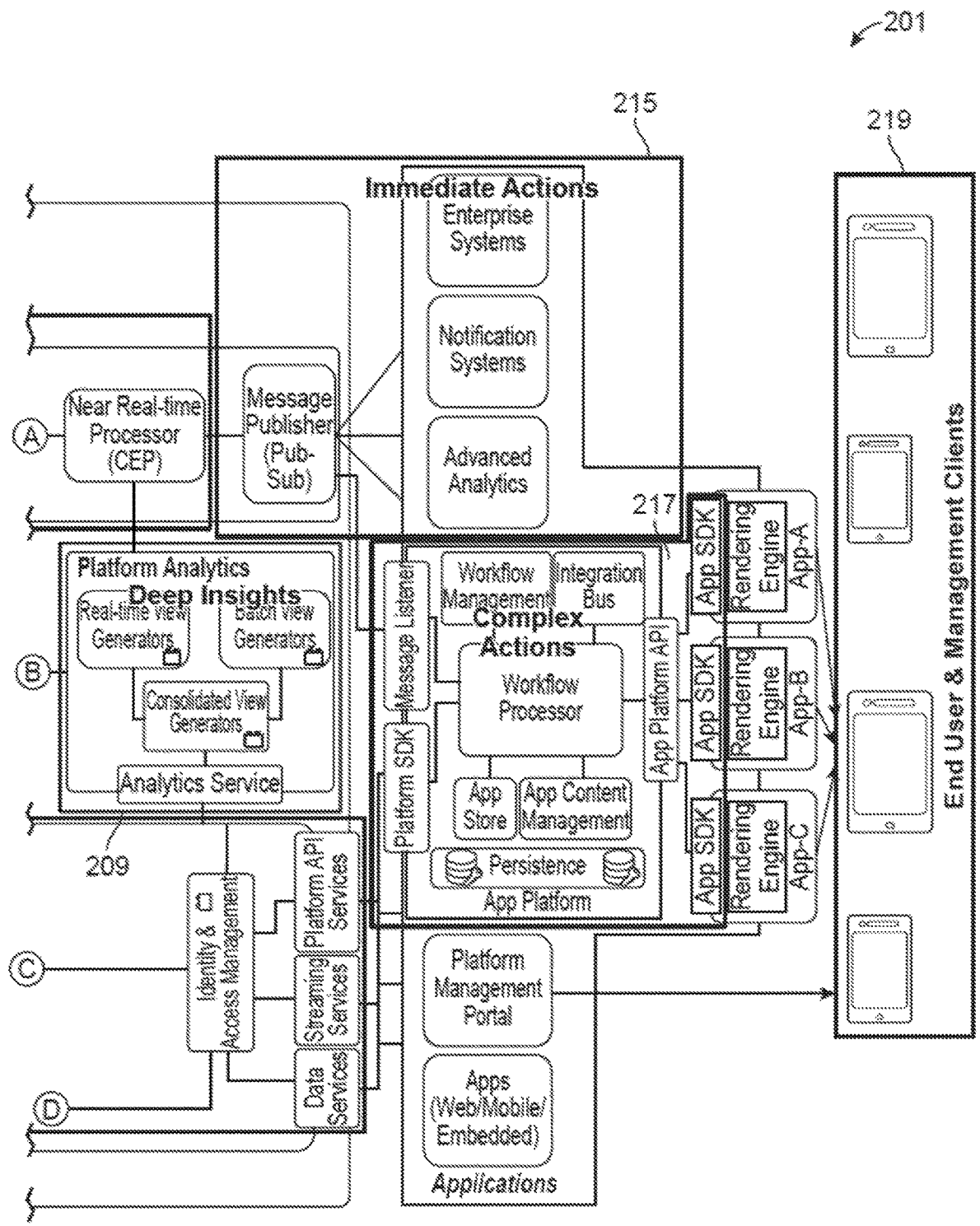

FIG. 2B shows an exemplary high-level architecture 201 showing the correlation between the functions in FIG. 1 and the implementation in FIG. 2A. Reference characters A, B, C, and D are used to show connections within FIG. 2B. A M2M, Devices and Intelligent Gateways grouping 203 includes the Resources module and Platform Gateway module. A Fast Decision Making grouping 205 includes the Message Collector module, Tenant Handler module, Message Handler module, and Near Real-Time Processor (CEP) module. The Historical Information grouping 207 includes the Platform (Polyglot) Persistence module. The Deep Insights grouping 209 includes the Platform Analytics module. The Supporting Functions grouping 211 includes the Platform Services module. The External Federated Data grouping 213 includes external federated data for the Platform module. The immediate actions grouping 215 includes the Message Publisher module of the Platform module, and the Enterprise Systems module, Notifications Systems module, and Advanced Analytics module of the Applications module. The Complex Actions grouping 217 includes the App Platform module 216 of the Applications module. The End User & Management Clients grouping 219 includes one or more client and/or tenant devices that receive one or more notifications that they are subscribed to from the Complex Actions grouping 217.

Figure 3:
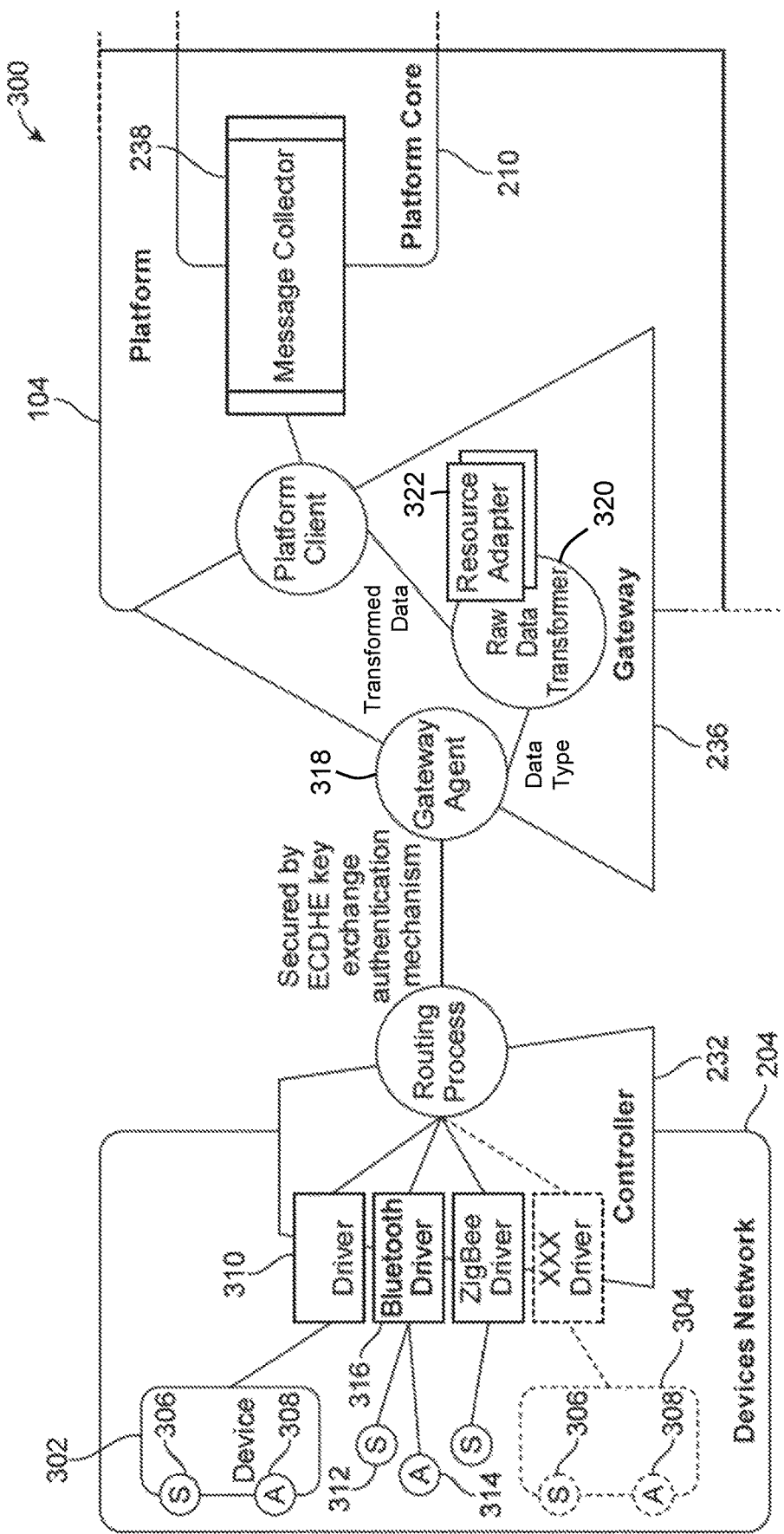
FIG. 3 shows an exemplary gateway interface and process for information sensing.

FIG. 3 shows an exemplary gateway interface 300 for information sensing. A Device network module 204 may include one or more user devices (302, 304) (e.g., a smartphone) that may each have one or more sensors 306 and/or actuators 308. These one or more user devices (302, 304) may connect and send data and/or requests to a Controller module 232 via a driver 310. Independent sensors 312 and/or actuators 314 may also send data and/or requests to the Controller module 232 via a driver 316. The Controller module 232 may create a secure connection (e.g., by an elliptic curve diffie-hellman (ECDHE) key exchange authentication mechanism) with the Gateway module 236 of a Platform Gateway module (208, FIG. 2A). The Gateway module 236 abstracts out any device-specific and/or communication-specific information from the one or more devices (302, 304). The data received by the Gateway module 236 from the Controller module 232 is formed into a message (i.e., a Platform module 104 specific format). The message formed by the Gateway module 236 is transmitted to the Message Collector module 238 of the Platform Core module 210 for further processing.

Sensors 306, or even a person using a device such as a smartphone 302, as Resources, provide data that gets sent to a Controller 232. In some embodiments, the Controller 232 resides on the smart device. The Controller 232 may reside in a field location (e.g., a farm building that may include a plurality of controllers and a plurality of connected Resources). The Controller securely communicates with the Gateway 236, which may reside in an off-site location (i.e., the cloud). The Gateway Agent module 318 may determine what type of data (e.g., what device make and model of device the data originated from) is being received by the Gateway module 236. The Gateway Agent module 318 sends this data along with the determined type of data to the Raw Data Transformer module 320, which consults the Resource Adapter module 322 as a set of data transformation files (e.g., for thermostat X, execute conversions A, B, and C on the data). The data conversions may be (e.g., binary to ASCII, etc.). Other third-party machine and IoT networks may connect to the disclosed system for processing via the Gateway module 236 by transforming the data into a format usable by the message collector module 238 of the platform core module 210.

Figure 4:
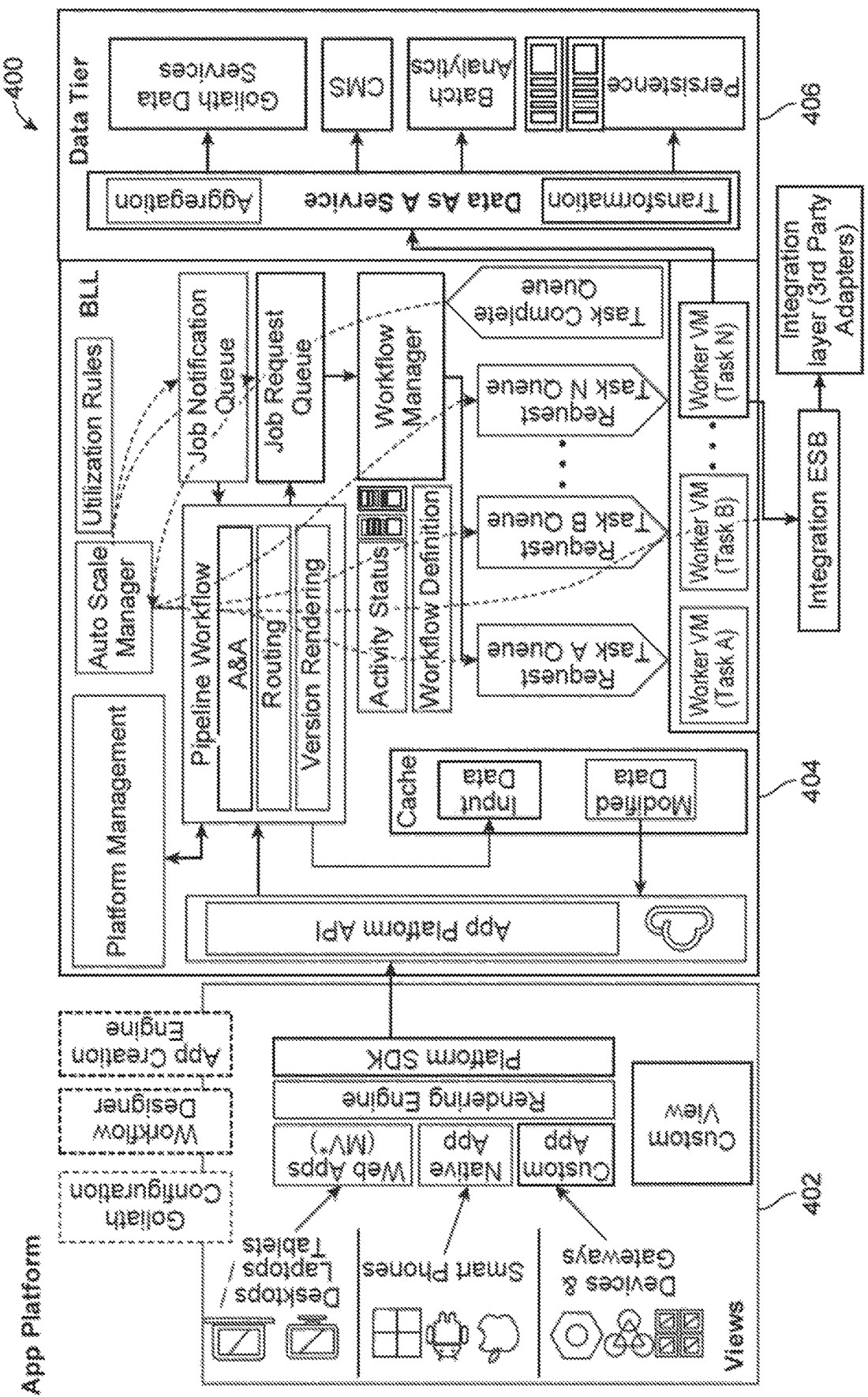
FIG. 4 shows an exemplary application platform process.

FIG. 4 shows an exemplary application platform 400. The exemplary application platform 400 shows an exemplary view of the workflow of the App Platform module (216, FIG. 2A). The exemplary application platform may include a views layer 402, a business logic layer (BLL) 404, and a data tier layer 406. An event that arrives goes into a work queue and into a workflow management that breaks up the event into steps required to complete the event. For example, an event of ordering a pizza would be split up into tasks by the workflow manager (e.g., find GPS location of person ordering the pizza, find GPS location of closest delivery vehicle, etc.)

The views layer 402 may include a Listener, a Platform Management Portal, a Workflow Designer, an App Creation Engine, a Custom View, an App, a Rendering Engine, and a Platform SDK. The Message listener is the one that listens for events from the core platform, and then routes the message to the correct workflow. These messages could be simple (e.g., temp >100° C.) but the workflow could be complex (e.g., based on the context, a fire engine and an ambulance could be ordered, or it could be a notification saying that water is boiling). The Platform Management Portal is where the Platform users can go and do their platform management tasks such as billing, creation of analytic models, and creation of embedded models. They can also control which other users can access this portal as well as review the usage of their app. The Workflow Designer is where authorized users can come and create their workflows that are being used in their apps. This gives users the ability to create and test an entire workflow, as well as manager versions, and deploy them to the production environment through this designer. The App Creation Engine is where authorized users can come and create their screens and see how the created screen would look in all platforms such as LCD panel, smart watch, phone, browser, etc. The Custom View is third party apps which are not using the App Platform and its benefits to utilize the benefits of the Core Platform. We have provided an avenue for such apps to exist as well. The App is a self-contained program or piece of software designed to fulfill a particular purpose and, conceptually, is downloaded from an "App Store" and used in multiple systems. The app SDK gets the content from the App Content Management System, and then needs to render it on different systems. The Rendering engine is an engine that is built per system, so the App can render all capabilities properly on the system/device. A given application, for example, could have an iOS rendering engine, an Android rendering engine, a web rendering engine, and so on. The way for the app to interact with the Platform where the authentication, authorization, and the how is already baked into the SDK. Using the SDK, the developer can build their apps quickly and efficiently.

The BLL may include an App Platform API, a Platform Management, an Auto Scale Manager, a Utilization Rules, a Pipeline workflow including A&A, routing, and version rendering, a Job Notification Queue, a Job Request Queue, a Workflow Management, an Activity Status, a Workflow Definition, a Cache including input data and modified data, a plurality of requests tasks including worker VMs, and a Task Complete Queue. The App Platform API is all of the workflows and persistence data stored and the functionality of the App Platform is available by a Micro Service API which is the App Platform API. It's the external end points to be used by all to access the functionality within. Platform Management is showing the Core Platform in this design. The Pipeline Workflows use it to get the data to decide what to do. The Auto Scale Manager increases or decreases the computing power available to the platform so that it can do its job the most efficiently and under SLA. It is required for effective utilization of computing resources. The Auto Scale Manager uses the Utilization rules to decide how to effectively utilize the computing resources. These have rules which indicate how much computing power is required for each use case and what kind of resources can service that need. Authorization & Authentication (A&A) is anyone trying to access the system needs to be authenticated to ensure we know its identity and authorized so that we know they are accessing what ever they should. Routing could have specific routing as EU data rules indicate that all data needs to be within the EU. So overall the system is flexible enough to understand where it needs to go to handle a particular use case and it could be tenant specific, country specific, app specific or even use case specific. Version Rendering is so each app could use multiple versions, based on the content and the use case and the workflow. This engine ensures that the right version of the above is being routed to the particular users/device. The Workflow Manager uses the Job Notification Queue to let the API know that the result is done, and the result is ready for the API to send back to the user/device. The Workflow Manager uses the Job Request Queue to know what workflow next needs to be picked up based on the settings of the Request Queue. Workflow Manager is the engine that manages the versioning, storing and handling of workflows. As described above, the Workflow is a semantic algorithm that is stored as a document, and needs to be versioned, and managed. Activity Status preserves the workflow status and the activities done on it. This also maintains a history of activities done so that trouble shooting can occur in exceptional circumstances. Workflow Definition preserves the actual workflow definition and the version that is being used by the workflow manager to service a request. Input Data is where the input payload received by the App Platform API is stored. Modified Data is where the output payload from each worker and the final payload is stored. Request Task A through Request Task N include Worker VM (Task A . . . N), which are workers or actors that are independent and know only one thing to do. How to execute a payment, how to call a cab, how to record a call, how to shut off the coffee maker. All of these independent workers are chained together in a workflow and the definition decides the order of execution. After each Request is received and executed, when it has been serviced, a notification goes to the Task Complete Queue, so that the Workflow Manager may pick it up and decide what the next step is for the workflow to execute.

The Data Tier 406 includes a Platform Access Layer including transformation and aggregation, an App DB, Platform Config. Services, a Streaming Service, a content management system (CMS), Goliath Data services, an Integration ESB, and an Integration Layer. The Transformation Engine ensures that the data is exactly what is required for each worker (e.g., temp can be stored in different apps in Celsius, Fahrenheit and Kelvin), and this engine would transform it so that the right reading is sent to the right worker. The Aggregation Engine pulls the data from multiple sources and aggregates it to make the most comprehensive view (e.g., if the disclosed system is showing a list of people on a map, the list of actual people would come from one place, the map co-ordinates would come from another store and the icons that need to be shown next to them would come from somewhere else). This engine would aggregate the data up to ensure the view is complete and coherent. The App DB is the data store for each app. Each app can decide what kind of persistent store they would like, such as an RDBMS, NoSql, newSQL, columnar, graphical, etc. They could also have polyglot needs with multiple types of DBs for different use cases. The Platform Config Services provides the mechanism to store, retrieve and update the various configurations that are required for the running of the Platform. All of the videos and data streams are stored, retrieved and updated from the Streaming Services. The Apps need to show content and render it coherently across all sorts of devices and operating systems. The content is managed via the App Content management system (CMS). All of the data available in the Platform (Polyglot) Persistence module can be retrieved, updated and stored from the App Platform using Goliath Data Services. Integration ESB provides a facility for all third party integrations needing a layer to integrate the Platform to the external application. This layer provides throttling, fault handling and other such mechanisms in order to ensure that downtimes with these external systems do not affect the operations of the Platform. Integration layer (3rd party adapters) are external enterprise systems that the Platform interacts with. Examples of such systems would be the system of Record for Insurance details, truck details, and government resources (e.g., Drivers License, SSN).

Figure 5:
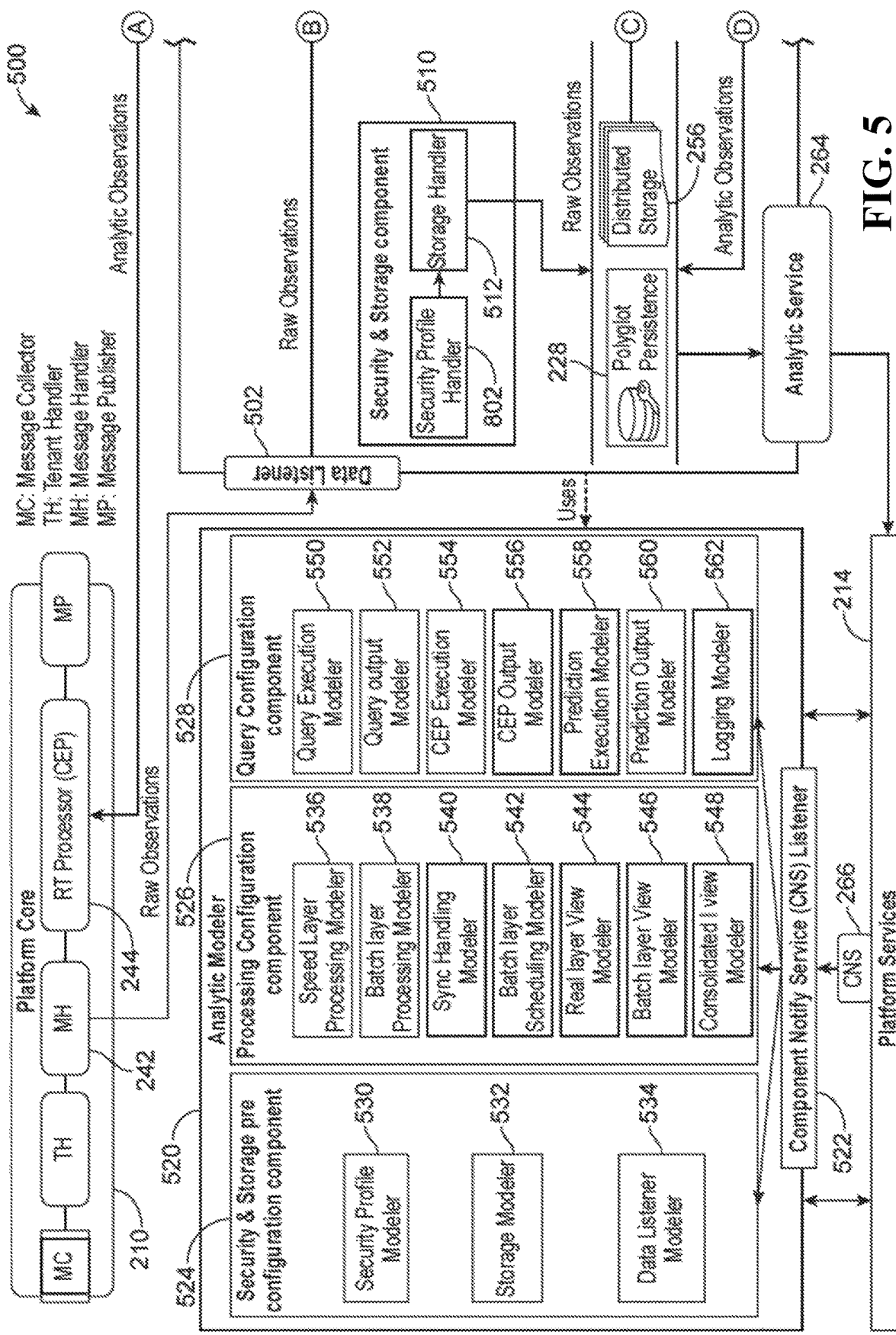
FIG. 5 shows an exemplary high-level architecture diagram and process for analysis and persistence functions.
Figure 5:
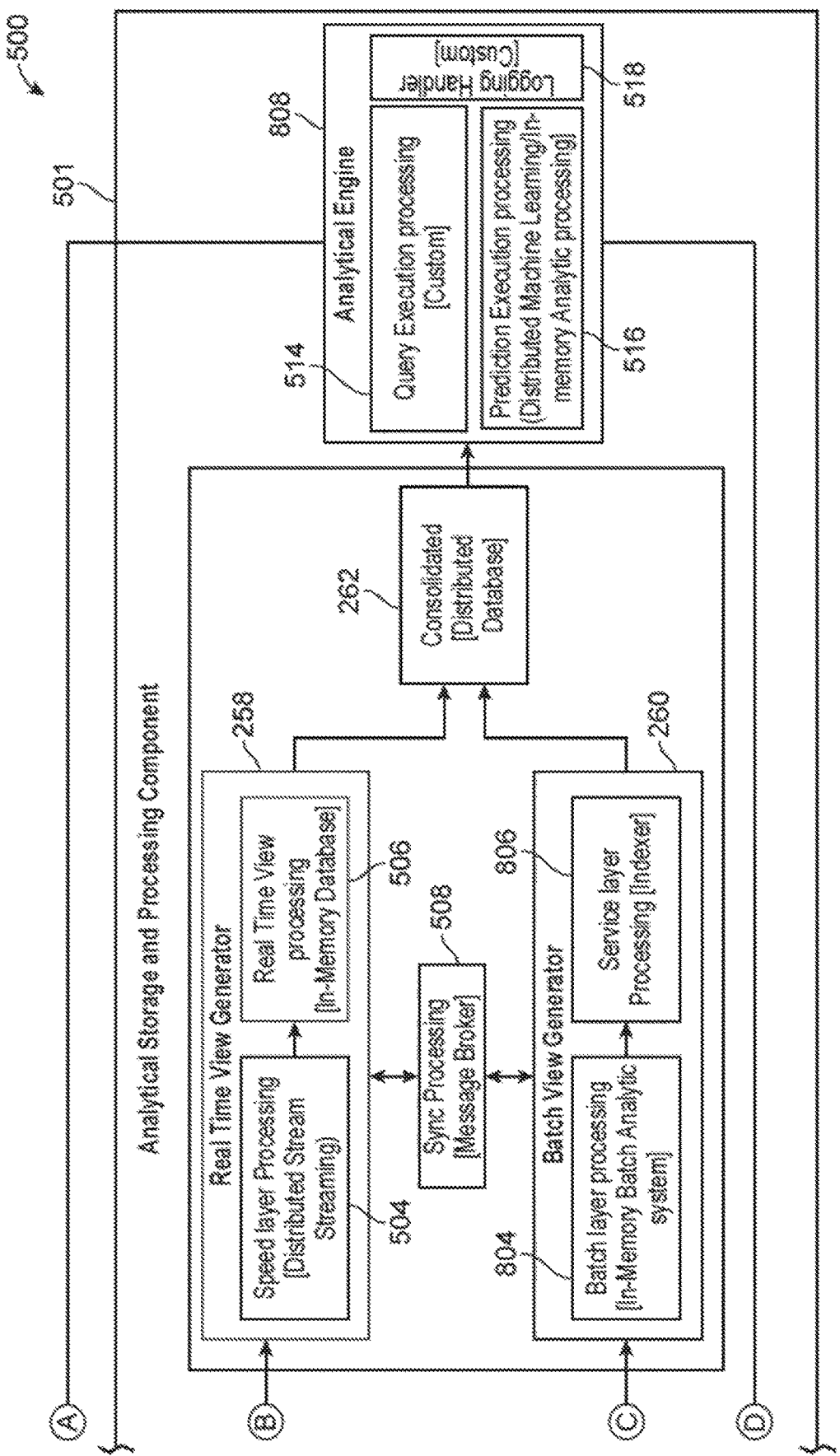

FIG. 5 shows an exemplary high-level architecture diagram 500 for analysis and persistence functions. Reference characters A, B, C, and D are used to show connections within FIG. 5. The Analytic Modeler component 520 contains the schemas and data formatting logic required to format data produced, accessed, and used within the system. These include schemas and data formatting logic for Security 530 and Storage 532, Processing components 526, and for Queries and Query results 528. Query formatting logic might include, for example, Query-forming data messaging scripts such as for example "Apache Pig" map-reduce scripts used to access an Apace Hive data warehouse, or tokenized SQL queries, as another example. The Data Listener Modeler 534 also contains pointers and access logic, for example URLs, URIs, RESTful queries, calls to data fabric, ETL scripts and so on that are required to access external data sources.

The Message Handler module 242 of the Platform Core module 210 may send raw observations to a Data Listener module 502 of an Analytical Storage and Processing Component module 501. The Data Listener module 502 sends raw observations to the Real Time View Generator module 258. A Security & Storage component module 510 including a Security Profile Handler module 802 and a Storage Handler module 512 send raw observations to the Polyglot Persistence module 228 with Distributed Storage 256, which is input to the Batch View Generator module 260. The Real Time View Generator module includes Speed layer processing (e.g., distributed stream streaming) 504 and Real time view processing (e.g., in-memory database). The Batch View Generator module 260 includes a Batch layer processing 506 (e.g., in-memory batch analytic system) and a service layer processing (e.g., indexer). The Real Time View Generator module 258 and Batch View Generator module 260 avoid duplication of tasks via a Sync Processing module (e.g., message broker) 508. The output of the Real Time View Generator module 258 and the Batch View Generator module 260 are combined by the Consolidated View module (e.g., distributed database) 262.

The output of the Consolidated View module 262 is received by an Analytic Engine module 808. The Analytic Engine module 808 includes a Query Exception Processing module 514, a Prediction Execution Processing module (e.g., distributed machine learning/in-memory analytic processing) 516, and a Logging Handler module 518. Analytic observations from the Analytic Engine module 808 are sent to the Polyglot Persistence module 228 and Distributed Storage 256, and then to the Analytic Service module 264. Analytic observations from the Analytic Engine module 808 are also sent to the Real-Time Processor (CEP) module 244 of the Platform Core module 210.

The Analytic service module 264 output is sent to the Platform Services module 214. The Component Notify Service module 266 of the Platform Services module 214 communicates with a Component Notify Service (CNS) Listener module 522 of an Analytic Modeler module 520. The Analytic Modeler module 520 includes a Security & Storage pre-configuration component module 524, a Processing configuration component module 526, and a Query configuration component module 528. The Security & Storage pre-configuration component module 524 includes a Security Profile Modeler module 530, a Storage Modeler module 532, and a Data Listener module 534. The Processing configuration component module 526 includes a Speed Layer Processing Modeler module 536, a Batch layer Processing Modeler 538, a Sync Handling Modeler module 540, a Batch layer Scheduling Modeler module 542, a Real layer View Modeler module 544, a Batch layer View Modeler module 546, and a Consolidated I view Modeler module 548. The Query Configuration component module 528 includes a Query Execution Modeler module 550, a Query output Modeler module 552, a CEP Execution Modeler module 554, a CEP Output Modeler module 556, a Prediction Execution Modeler module 558, a Prediction Output Modeler module 560, and a Logging Modeler module 562.

The Platform Core module includes the Message Collector module, the Tenant Handler module, the Message Handler module 242, the Real-Time Processor (CEP) module 244, and the Message Publisher module. The Message Collector module is responsible for collecting the messages from the Gateway and forwarding it for further processing. It is a multi-consumer queue implementation with consumers (Tenant Handler) capable of handling very large stream of data at low latency. It is in this module where the Message is sent to Platform Persistence for storage. The Tenant Handler module is responsible for processing each Message captured by Message Collector module to abstract tenant information and send it to a respective Message Handler of the tenant. The Message Handler module 242 is where the Message is processed for applying business logic. The output of Message Handler is a business object that is passed to Platform Persistence for storage. It is input to the Near Real-time processor. The Near Real-time Processor module 244 applies the pre-defined business rules on the business objects pushed into it by Message Handler module 242. Events can be generated by the Near Real-time Processor module 244 based on the configured business rules. These events are passed to the Message Publisher module. The Message Publisher module is based on a pub-sub model. It publishes the events generated by the Near Real-time Processor module 244 to the subscribers of those events.

The Analytical Storage and Processing Component module 501 stores and processes the observations as configured by Analytics Modeler module 520. The Analytical engine module 808 is the component that enables both the predictive and prescriptive analytics on the data and produces Analytics Observations. These observations can be persisted in polygot persistence or can be exposed using Analytics Services to CEP or Platform Services. The component performs following actions. Query Execution Processing (Custom) 514: any insight required on the data is being performed by this component. The component can run on both speed layer and batch layer and can retrieve combined views of the data. Prediction Execution Processing (Distributed Machine Learning/In-Memory Analytical Processing) 516: the component runs certain machine learning algorithm on distributed platform. This can either run on speed layer or batch layer. Logging Handler (custom) 518: This module logs all the activities of the Analytics engine.

The Analytics Processor includes the following modules. The Consolidated View (Distributed Database) 262 generates a combined view out of batch and real time views. This can either keep the pre-generated views or can generate whenever there is service request. Default is to generate on a service request. The Real time view generator 258 is distributed, fault tolerance entity which processes unbound stream of data. The Speed Layer Processing (Distributed Stream Streaming) 504 collects streams of data and performs continuous computation in real time. The Real Time View Processing (In-Memory Database) 506 generates real time views as specified by Real Time View generator 258 and stores them in an in-memory database to be used by Consolidated View Generator 262. The Sync Processing (Message Broker) 508 enables both speed layer and batch layers to be kept in sync to implement Lambda architecture. The component carries specific messages when a batch has started or finished execution and notifies consolidated views to refresh itself. The Batch View Generator 260 is a distributed scalable entity which build batch view from the historical data. The batch layer processing (In-memory batch analytic system) 804 processes large datasets and provides data summarization, querying and analysis. The Service Layer processing (Indexer) 806 generates indexed batch views which is used to generate consolidated views faster.

The Raw Observations are observations received by platform analytics. Generally they are enriched with tenant and domain ID. The Data Listener module 502 listens incoming platform messages and manages the traffic of these request to analytics processor and polygot persistence 228. The Security & Storage Component 510 deals with persistence and security requirement of the application. The Security Profile Handler 802 applies security profile as specified by Security profile modeler. The Storage Handler 512 persists messages as specified by Storage Modeler. The Polyglot Persistence module 228 can store using multiple distributed data storage technologies like file system, database, no-sql database, in-memory etc. The storage mechanism can be chosen at data modeling and provisioning time based on the type of data or the way data will be used. The Distributed Storage module 256 distributes the file across various storage nodes for fault tolerance and high availability. Raw Observations are observations received by platform analytics. Generally they are enriched with tenant and domain ID. Analytic Observations are observations generated by analytics engine. This could be service output or future points. The Analytic Service module 264 is the component which exposes polygot persistence data over RPC.

The Component Notification Service (CNS) 266 listens for component specific events generated by platform services 214. These events helps to add dynamic behavior to the platform. So if any configuration is updated in any one of the components of the Platform, then CNS notifies all the components who have subscribed for that update. Some of the events for which platform analytics registers include: registering a new tenant; registering a new domain; registering/modify domain specific queries; and tenant/domain specific security profile.

The Analytic Modeler component 520 contains the schemas and data formatting logic required to format data produced, accessed, and used within the system. These include schemas and data formatting logic for Security 530 and Storage 532, processing components 526, and for Queries and Query results 528. Query formatting logic might include, for example, Query-forming data massaging scripts such as for example "Apache Pig" map-reduce scripts used to access an Apace Hive data warehouse, or tokenized SQL queries, as another example. The Data Listener Modeler 534 also contains pointers and access logic, for example URLs, URIs, RESTful queries, calls to data fabric, ETL scripts and so on that are required to access external data sources.

When a new domain/tenant is provisioned in Goliath, Goliath Analytics component gets notified through component notification service and provision itself. This creates corresponding data models and enables tenant specific services through analytics service component.

The Security & Storage Pre-configuration component 524 includes the following modules. The Security profile modeler 530 enables security profile for the data. It performs below checks and correspondingly enables data services. Checks if message or a part of message needs to be persisted in polygot persistence. Checks if message or part of message needs to be masked before persisting. Checks if message or part of message needs to be encrypted/decrypted before persisting. The component can interact with third party encryption/decryption key and configure it to be used by Analytics Security Agent. This component also enables restricted access to tenant and domain specific storage in polygot persistence. The Storage modeler 532 configures data warehouse infrastructure. Checks if data needs to be persisted for speed layer or batch layer or both. Instantiate corresponding modeler. The Data Listener modeler 534 downloads and configures domain/tenant specific schema. Registers message producers. Configure domain message parser.

The Processing configuration component 526 includes the following modules. The Speed Layer processing modeler 536 extract tenant and domain specific configurations, constructs data model queries for speed layer, creates speed layer data model, and configures frequency of generating new speed views. The Batch Layer processing modeler 538 extracts tenant and domain specific configurations, constructs data model queries for batch layer, creates data model in batch layer, and configures frequency of generating batch views. The Sync Handling modeler 540 generates speed layer and batch layer sync logic, and notifies speed layer when a new batch view is generated for it to merge batch views and reset speed views. The Batch layer scheduling modeler 542 creates workflow scheduler to manage batch jobs/queries. The Real layer view modeler 544 creates data model for the views that will be populated by speed layer processing. The Batch layer view modeler 546 creates data model for the views that will be populated by batch jobs. The Consolidated I view modeler 548 creates model for exposing data from analytics services.

Query configuration component 528 includes the following modules. The Query execution modeler 550 creates query wrapper which generates batch and speed layer specific queries from the query service exposed by Platform Services; Configures query execution (e.g., a query can be flagged to be analyzed using speed layer), and manages query versioning and query life cycle. The Query output modeler 552 models how the output of query should be. The CEP execution modeler 554 identifies if CEP views needs to be generated for the specified analytics services, configures frequency of exposing data, where the default frequency is generation of new speed views, and shares the messaging contract with CEP engine. It includes the output schema and frequency of messages. The CEP output modeler 556 creates model/schema for exposing data to CEP engine. The Prediction execution modeler 558 configures algorithm processor (e.g., Mahout or Spark ML or R), loads corresponding engine if it is not already loaded, and creates model for some machine learning algorithm for elps in creating certain machine learning models with the algorithm specific details. The Prediction output modeler 560 creates model for prediction views, and instantiate data formatter, which formats the algorithm data in specified output views. The Logging modeler 562 configures level of application logging.

Figure 6:
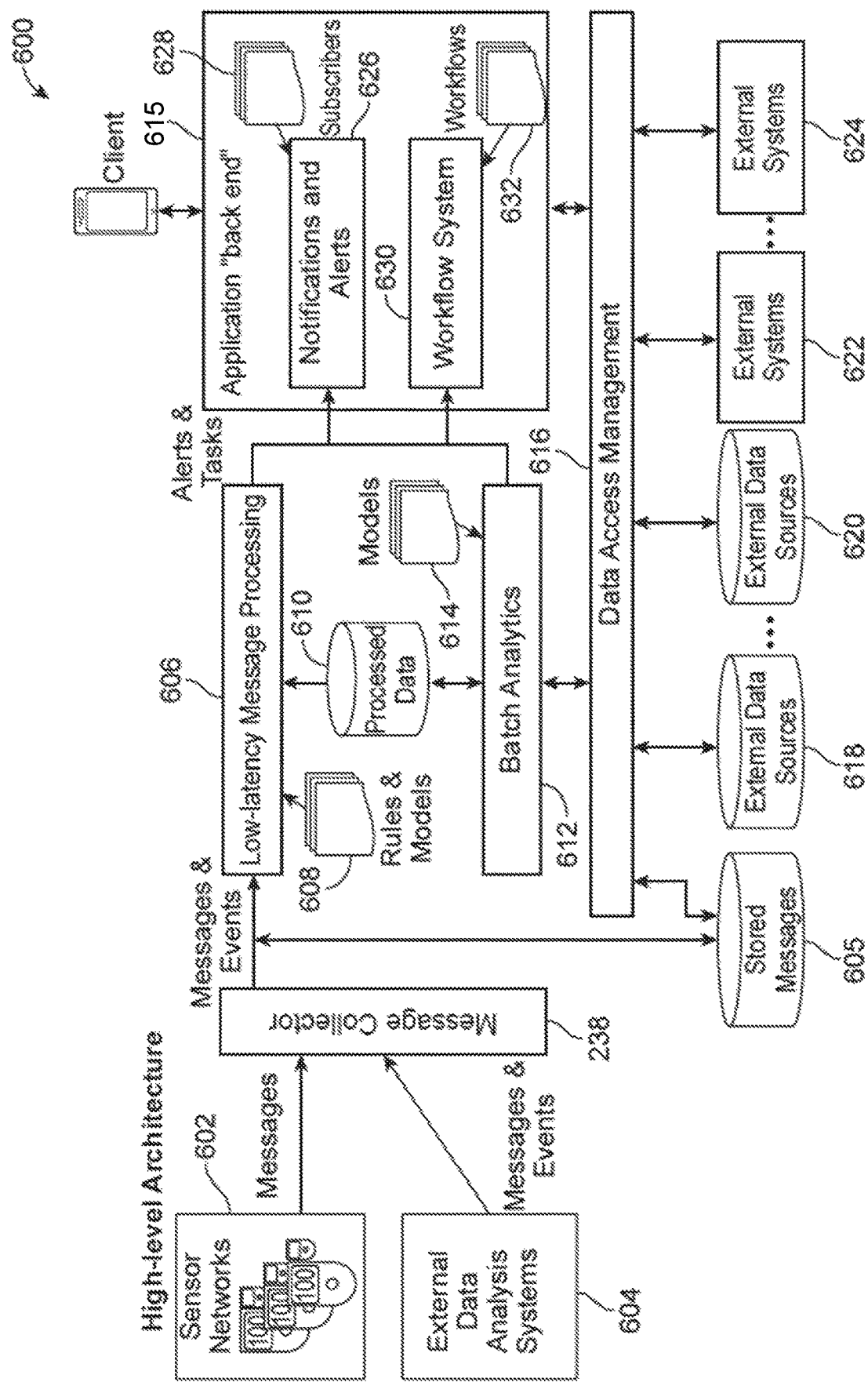
FIG. 6 shows a block diagram illustrating a high level architecture and process of an implementation of the system.

FIG. 6 shows a block diagram illustrating a high-level architecture 600 of an implementation of the system. A Message Collector module 238 receives data from one or more sensor networks 602 and/or one or more External Data Analysis Systems 604. Messages and events from the Message Collector module 238 are stored 605 and transmitted to a Low-Latency Message Processing module 606, which uses Rules & Models 608 and/or Processed Data 610 to create Alerts & Tasks. The Processed Data 610 is illustrated in FIG. 5 with the exception of the Platform Core module. The Alerts and Tasks from the Low-Latency Message Processing module 606 are sent to a Batch Analytics module 612 and an Application "back end" 615. The Batch Analytics module 612 uses models 614 and data access management 616, which accesses stored messages 605, one or more external data sources (618, 620), and one or more external systems (622, 624). The Application "back end" 615 includes Notification and Alerts 626 to Subscribers 628 and a Workflow System 630 with more advanced Workflows 632. The Application "back end" 615 may also access the Data Access Management 616.

Figure 7:
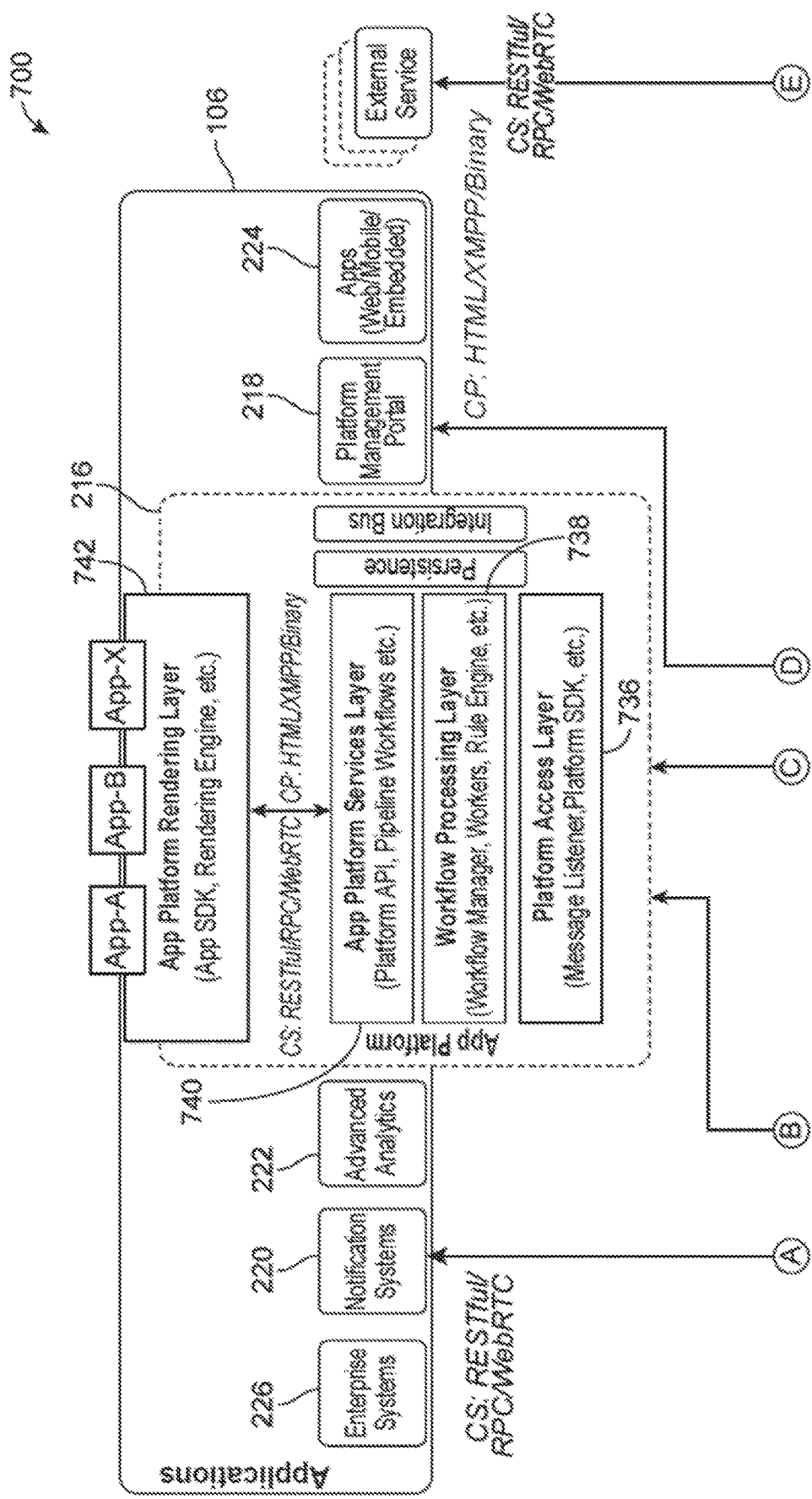
FIG. 7 shows a high-level architecture and process of a layered view of the functional components of the system.
Figure 7:
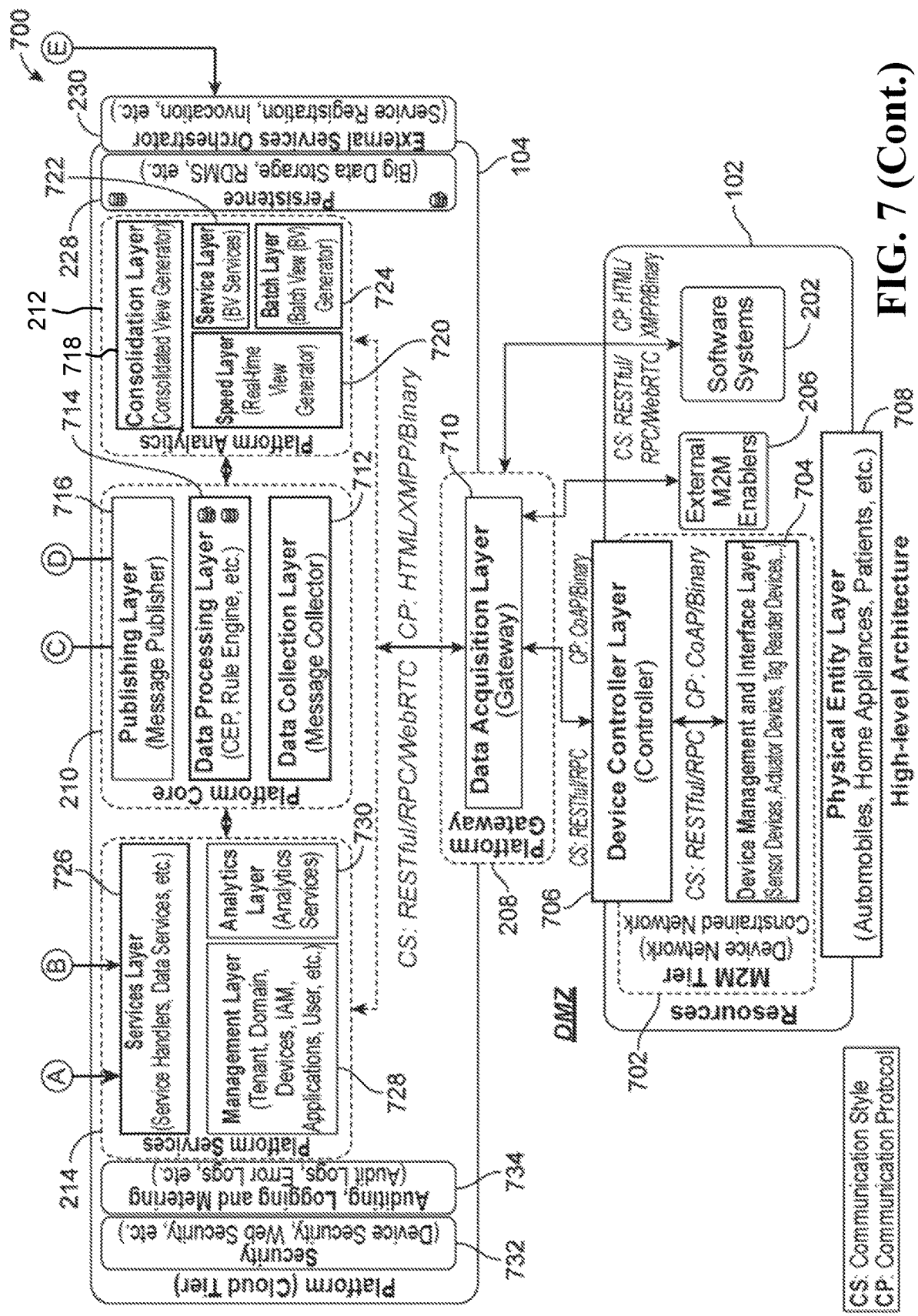

FIG. 7 shows a high-level architecture 700 of a layered view of the functional components of the system. Reference characters A, B, C, D, and E are used to show connections within FIG. 7. The system 700 includes the Resources module 102, the Platform module 104, and the Applications module 106. FIG. 7 depicts the protocols used in an embodiment of the disclosed system.

The Resources module 102 includes the Software Systems module 202, the External M2M Enablers module 206, and the M2M Tier 702. The M2M Tier includes a Device Management and Interface layer 704 (e.g., sensor devices, actuator devices, tag reader devices, etc.) and a Device Controller layer 706. The Resources module 102 includes a Physical Entity layer 708 (e.g., Automobiles, Home Appliances, Patients, etc.).

The Platform module 104 includes the Platform Gateway module 208, the Platform Core module 210, the Platform Analytics module 212, the Platform Services module 214, the Persistence module 228, and the External Services Orchestrator module 230. The Platform Gateway module 208 includes a Data Acquisition layer 710 (e.g., a Gateway). The Platform Core module 210 includes a Data Collection layer 712 (e.g., the Message Collector module), a Data Processing layer 714 (e.g., the Near-Real Time Processor module, Rule Engine module, etc.), and a Publishing layer 716 (e.g., the Message Publisher module). The Platform Analytics module 212 includes a Consolidation layer 718 (e.g., the Consolidated View Generator module), a Speed layer 720 (e.g., the Real-Time View Generator module), a Service layer 722 (e.g., BV Services), and a Batch layer 724 (e.g., the Batch View Generator module). The Platform Services module includes a Services layer 726 (e.g., the Data Services module, Service Handlers, etc.), a Management layer 728 (e.g., the Tenant Management module, the Domain Provisioning & Management module, the User Management module, etc.), and an Analytics layer 730 (e.g., the Analytics Service module). The Platform module 104 may also include a Security module 732 (e.g., Device security, web security, etc.) and an Auditing, Logging, and Metering module 734 (e.g., audit logs, error logs, etc.).

The Applications module 106 includes the Enterprise Systems module 226, the Notifications Systems module 220, the Advanced Analytics module 222, the App Platform module 216, the Platform Management Portal module 218, and the Apps module 224. The App Platform module 216 includes a Platform Access layer 736 (e.g., the Message Listener module, the Platform SDK module, etc.), a Workflow Processing layer 738 (e.g., the Workflow Manager module, the Workers module, the Rule Engine module, etc.), an App Platform Services Layer 740 (e.g., the Platform API module, the Pipeline Workflows module, etc.), and an App Platform Rendering layer 742 (e.g., the App SDK module, the Rendering Engine module, etc.)

Figure 8:
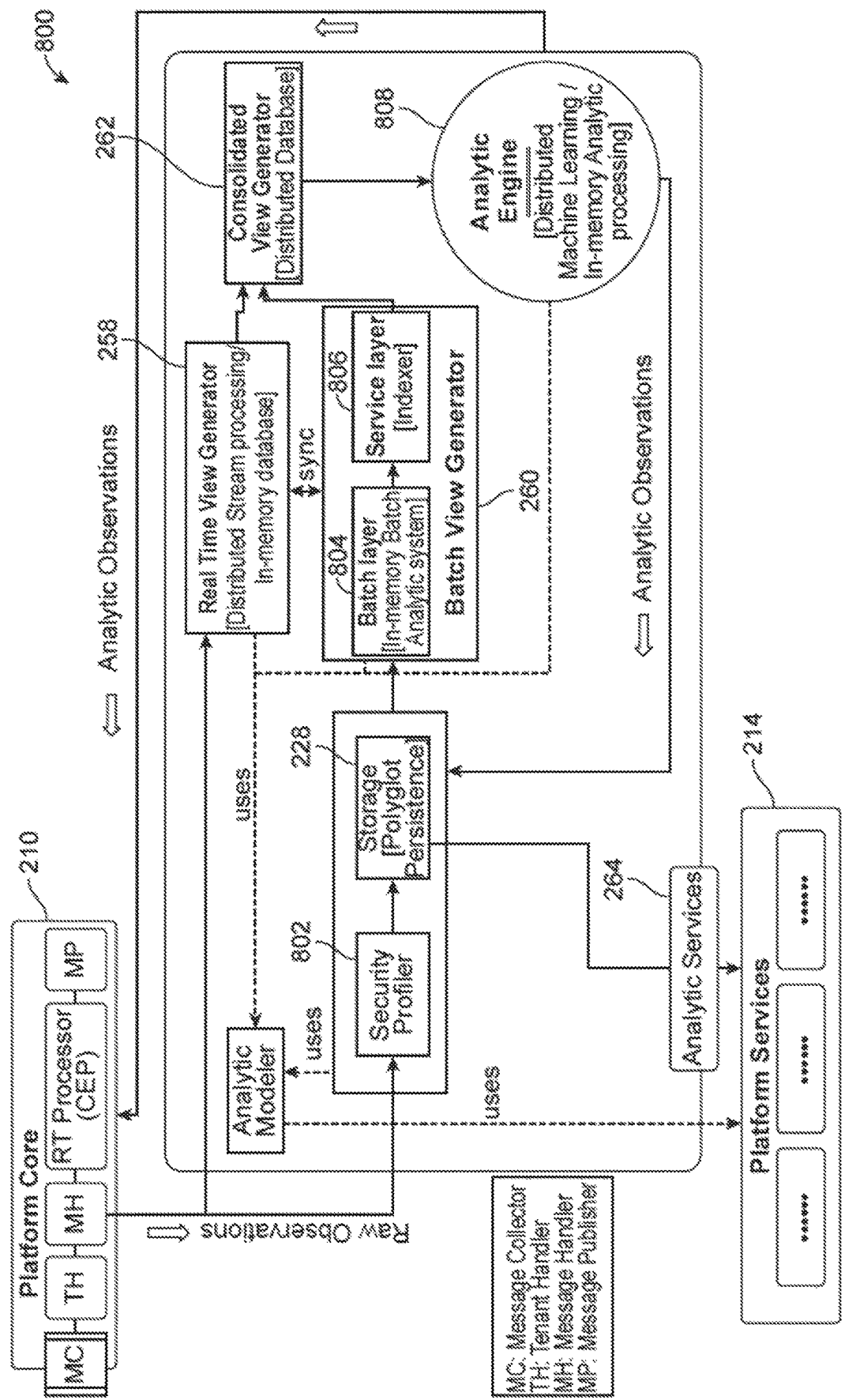
FIG. 8 shows details of an analysis function and process of the system.

FIG. 8 shows details of an analysis function 800 of the system. FIG. 8 depicts an embodiment of the Platform Analytics module communicating with the Platform Core module 210 and Platform Services module 214. The Platform Core module 210 sends raw observations to the Real Time View Generator module 258 and a Security Profiler module 802. The Real Time View Generator module 258 syncs with the Batch View Generator module 260 to prevent duplication. The output of the Security Profiler module 802 goes to the Polyglot Persistence module 228. The output of the Polyglot Persistence module 228 is sent to the Batch View Generator module 260 and the Analytics Service module 264. The output of the Analytics Service module 264 is sent to the Platform Services module 214. The Batch View Generator module 260 includes a Batch layer 804 (e.g., in-memory batch analytic system) and a Service layer 806 (e.g., an indexer). The outputs of the Real Time View Generator module 258 and the Batch View Generator module 260 are received by the Consolidated View Generator module 262 (e.g., a distributed database). The output of the Consolidated View Generator 262 is received by the Analytic Engine module 808 (e.g., distributed machine learning and/or in-memory analytic processing. The Analytic Engine module 808 outputs analytic observations to the Polyglot Persistence module 228 for use in future observations and/or calculations.

FIG. 9 shows a Java stack for implementation of the system 900. The primary programming language used is Java, but may be any other known programming languages. The frameworks used by the system may include a web application framework (e.g., Vert.x), an Inversion of Control (IoC) framework (e.g., Spring), a Javascript model-view-controller framer (e.g., AngularJS), a security framework (e.g., Apache Shiro), and a logging framework (e.g., LogBACK). The software components used by the system may include a message queue (e.g., Apache Kafka), a stream processing (e.g., Apache Spark Streaming), a rule engine (e.g., JBoss Drools), a workflow management (e.g., JBoss Drools (jBPM), and a notification service. The storage used by the system may include a relational database management system (RDBMS) (e.g., MySQL), a document-oriented NoSQL (e.g., Couchbase), a columnar NoSQL (e.g., HBase), a NewSQL in-memory database (e.g., VoltDB), a database encryption such as transparent data encryption (TDE) (e.g., Gazzang), a distributed file system (e.g., HDFS), and an embedded database (e.g., Couchbase Lite). The M2M components used by the system may include an M2M framework (e.g., AllJoyn), an M2M security server (e.g., AllJoyn), and a gateway (e.g., Objective C & Java).

The analytics components used by the system may include data storage (e.g., HBase), stream processing (e.g., Apache Spark Streaming), batch processing (e.g., Apache Spark or Hadoop), a reporting database (e.g., Infobright), and a visualization tool (e.g., Jaspersoft). The primary programming language, frameworks, software components, storage, M2M, and analytics components of the system may include any other components known to one skilled in the art.

FIG. 10 shows a Microsoft (MS) stack for implementation of the system 1000. The primary programming language used by the system is C#, but may be any other known programming language. The frameworks used by the system may include a web application framework (e.g., ASP.NET MVC), an Inversion of Control (IoC) framework (e.g., Autofac), a Javascript model-view-controller framer (e.g., AngularJS), a security framework (e.g., .Net framework security), and a logging framework (e.g., log 4net). The software components used by the system may include a message queue (e.g., Apache Kafka), a stream processing (e.g., Apache Spark Streaming), a rule engine (e.g., NRules or custom built), a workflow management (e.g., Activiti or custom built), and a notification service. The storage used by the system may include a relational database management system (RDBMS) (e.g., MySQL), a document-oriented NoSQL (e.g., Couchbase), a columnar NoSQL (e.g., HBase), a NewSQL in-memory database (e.g., VoltDB), a database encryption such as transparent data encryption (TDE) (e.g., Gazzang), a distributed file system (e.g., HDFS), and an embedded database (e.g., Couchbase Lite). The M2M components used by the system may include an M2M framework (e.g., AllJoyn), an M2M security server (e.g., AllJoyn), and a gateway (e.g., Objective C & Java). The analytics components used by the system may include data storage (e.g., HBase), batch processing (e.g., Apache Spark or Hadoop), a reporting database (e.g., Infobright), and a visualization tool (e.g., Jaspersoft). The primary programming language, frameworks, software components, storage, M2M, and analytics components of the system may include any other components known to one skilled in the art.

Figure 11:
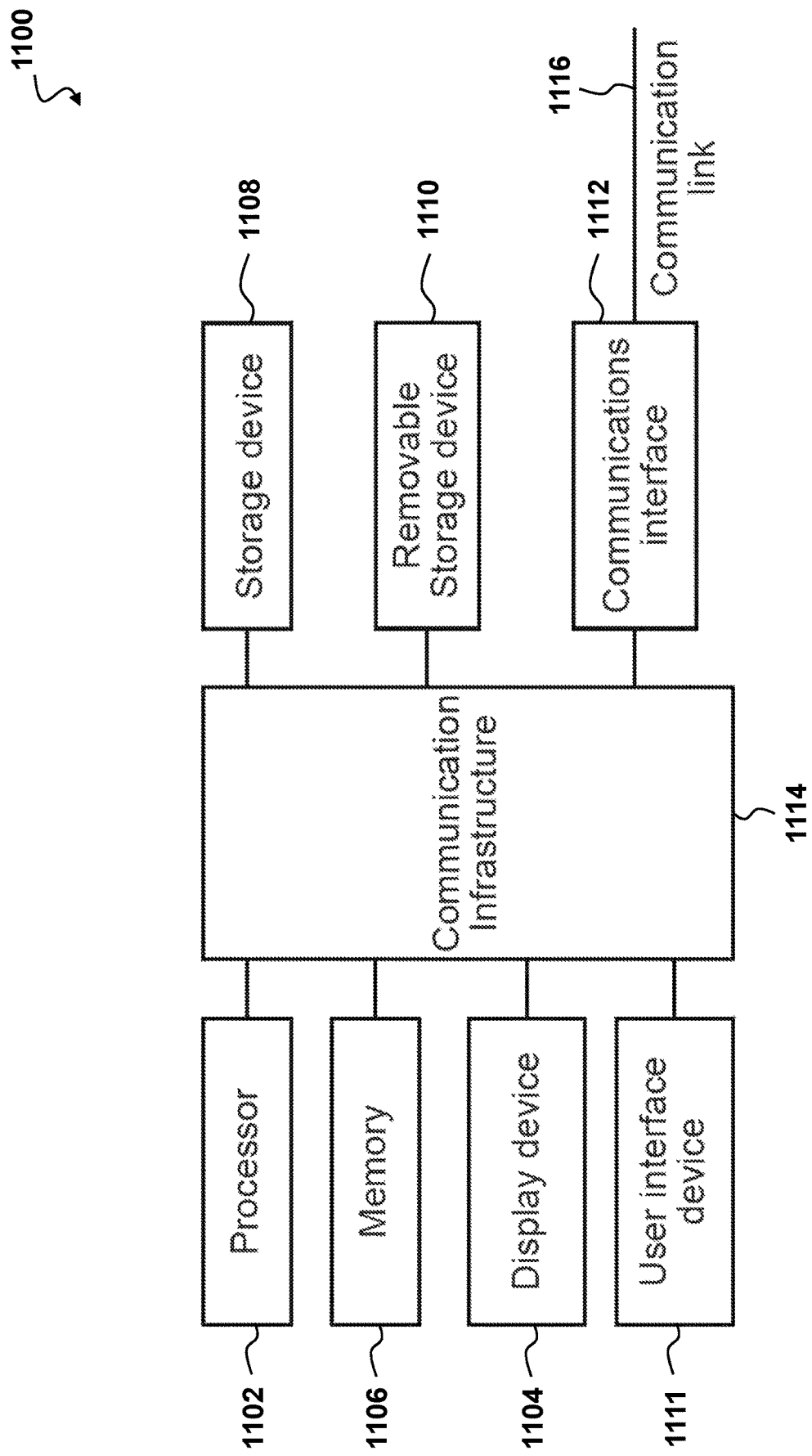
FIG. 11 shows a high-level block diagram and process of a computing system for implementing an embodiment of the system and process.

FIG. 11 is a high-level block diagram 1100 showing a computing system comprising a computer system useful for implementing an embodiment of the system and process, disclosed herein. Embodiments of the IoT system may be implemented in different computing environments. The computer system includes one or more processors 1102, and can further include an electronic display device 1104 (e.g., for displaying graphics, text, and other data), a main memory 1106 (e.g., random access memory (RAM)), storage device 1108, a removable storage device 1110 (e.g., removable storage drive, a removable memory module, a magnetic tape drive, an optical disk drive, a computer readable medium having stored therein computer software and/or data), user interface device 1111 (e.g., keyboard, touch screen, keypad, pointing device), and a communication interface 1112 (e.g., modem, a network interface (such as an Ethernet card), a communications port, or a PCMCIA slot and card). The communication interface 1112 allows software and data to be transferred between the computer system and external devices. The system further includes a communications infrastructure 1114 (e.g., a communications bus, cross-over bar, or network) to which the aforementioned devices/modules are connected as shown.

Information transferred via communications interface 1114 may be in the form of signals such as electronic, electromagnetic, optical, or other signals capable of being received by communications interface 1114, via a communication link 1116 that carries signals and may be implemented using wire or cable, fiber optics, a phone line, a cellular/mobile phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

Embodiments have been described with reference to flowchart illustrations and/or block diagrams of methods, apparatus (systems) and computer program products according to embodiments. Each block of such illustrations/diagrams, or combinations thereof, can be implemented by computer program instructions. The computer program instructions when provided to a processor produce a machine, such that the instructions, which execute via the processor, create means for implementing the functions/operations specified in the flowchart and/or block diagram. Each block in the flowchart/block diagrams may represent a hardware and/or software module or logic, implementing embodiments. In alternative implementations, the functions noted in the blocks may occur out of the order noted in the figures, concurrently, etc.

Computer programs (i.e., computer control logic) are stored in main memory and/or secondary memory. Computer programs may also be received via a communications interface 1112. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system.

Figure 12:
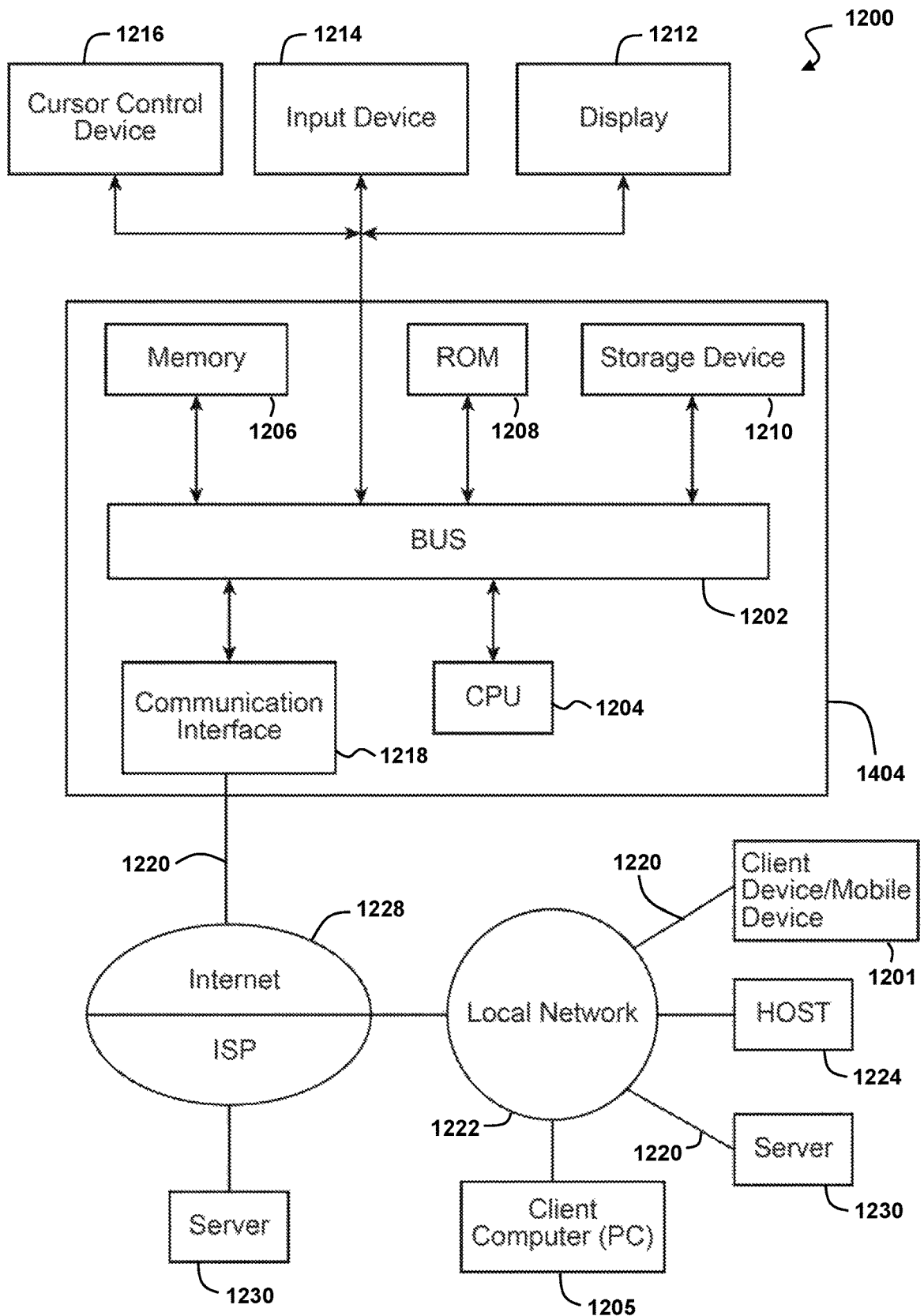
FIG. 12 shows a block diagram and process of an exemplary system in which an embodiment may be implemented.

FIG. 12 shows a block diagram of an example system 1200 in which an embodiment may be implemented. The system 1200 includes one or more client devices 1201 such as consumer electronics devices, connected to one or more server computing systems 1230. A server 1230 includes a bus 1202 or other communication mechanism for communicating information, and a processor (CPU) 1204 coupled with the bus 1202 for processing information. The server 1230 also includes a main memory 1206, such as a random access memory (RAM) or other dynamic storage device, coupled to the bus 1202 for storing information and instructions to be executed by the processor 1204. The main memory 1206 also may be used for storing temporary variables or other intermediate information during execution or instructions to be executed by the processor 1204. The server computer system 1230 further includes a read only memory (ROM) 1208 or other static storage device coupled to the bus 1202 for storing static information and instructions for the processor 1204. A storage device 1210, such as a magnetic disk or optical disk, is provided and coupled to the bus 1202 for storing information and instructions. The bus 1202 may contain, for example, thirty-two address lines for addressing video memory or main memory 1206. The bus 1202 can also include, for example, a 32-bit data bus for transferring data between and among the components, such as the CPU 1204, the main memory 1206, video memory and the storage 1210. Alternatively, multiplex data/address lines may be used instead of separate data and address lines.

The server 1230 may be coupled via the bus 1202 to a display 1212 for displaying information to a computer user. An input device 1214, including alphanumeric and other keys, is coupled to the bus 1202 for communicating information and command selections to the processor 1204.

Another type or user input device comprises cursor control 1216, such as a mouse, a trackball, or cursor direction keys for communicating direction information and command selections to the processor 1204 and for controlling cursor movement on the display 1212.

According to one embodiment, the functions are performed by the processor 1204 executing one or more sequences of one or more instructions contained in the main memory 1206. Such instructions may be read into the main memory 1206 from another computer-readable medium, such as the storage device 1210. Execution of the sequences of instructions contained in the main memory 1206 causes the processor 1204 to perform the process steps described herein. One or more processors in a multi-processing arrangement may also be employed to execute the sequences of instructions contained in the main memory 1206. In alternative embodiments, hard-wired circuitry may be used in place of or in combination with software instructions to implement the embodiments. Thus, embodiments are not limited to any specific combination of hardware circuitry and software.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information. Computer programs (also called computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor multi-core processor to perform the features of the computer system. Accordingly, such computer programs represent controllers of the computer system.

Generally, the term "computer-readable medium" as used herein refers to any medium that participated in providing instructions to the processor 1204 for execution. Such a medium may take many forms, including but not limited to, non-volatile media, volatile media, and transmission media. Non-volatile media includes, for example, optical or magnetic disks, such as the storage device 1210. Volatile media includes dynamic memory, such as the main memory 1206. Transmission media includes coaxial cables, copper wire and fiber optics, including the wires that comprise the bus 1202. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 1204 for execution. For example, the instructions may initially be carried on a magnetic disk of a remote computer. The remote computer can load the instructions into its dynamic memory and send the instructions over a telephone line using a modem. A modem local to the server 1230 can receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1206, from which the processor 1204 retrieves and executes the instructions. The instructions received from the main memory 1206 may optionally be stored on the storage device 1210 either before or after execution by the processor 1204.

The server 1230 also includes a communication interface 1218 coupled to the bus 1202. The communication interface 1218 provides a two-way data communication coupling to a network link 1220 that is connected to the world wide packet data communication network now commonly referred to as the Internet 1228. The Internet 1228 uses electrical, electromagnetic or optical signals that carry digital data streams. The signals through the various networks and the signals on the network link 1220 and through the communication interface 1218, which carry the digital data to and from the server 1230, are exemplary forms or carrier waves transporting the information.

In another embodiment of the server 1230, interface 1218 is connected to a network 1222 via a communication link 1220. For example, the communication interface 1218 may be an integrated services digital network (ISDN) card or a modem to provide a data communication connection to a corresponding type of telephone line, which can comprise part of the network link 1220. As another example, the communication interface 1218 may be a local area network (LAN) card to provide a data communication connection to a compatible LAN. Wireless links may also be implemented. In any such implementation, the communication interface 1218 sends and receives electrical electromagnetic or optical signals that carry digital data streams representing various types of information.

The network link 1220 typically provides data communication through one or more networks to other data devices. For example, the network link 1220 may provide a connection through the local network 1222 to a host computer 1224 or to data equipment operated by an Internet Service Provider (ISP). The ISP in turn provides data communication services through the Internet 1228. The local network 1222 and the Internet 1228 both use electrical, electromagnetic or optical signals that carry digital data streams. The signals through the various networks and the signals on the network link 1220 and through the communication interface 1218, which carry the digital data to and from the server 1230, are exemplary forms or carrier waves transporting the information.

The server 1230 can send/receive messages and data, including e-mail, program code, through the network, the network link 1220 and the communication interface 1218. Further, the communication interface 1218 can comprise a USB/Tuner and the network link 1220 may be an antenna or cable for connecting the server 1230 to a cable provider, satellite provider or other terrestrial transmission system for receiving messages, data and program code from another source.

The example versions of the embodiments described herein may be implemented as logical operations in a distributed processing system such as the system 1200 including the servers 1230. The logical operations of the embodiments may be implemented as a sequence of steps executing in the server 1230, and as interconnected machine modules within the system 1200. The implementation is a matter of choice and can depend on performance of the system 1200 implementing the embodiments. As such, the logical operations constituting said example versions of the embodiments are referred to for e.g., as operations, steps or modules.

Similar to a server 1230 described above, a client device 1201 can include a processor, memory, storage device, display, input device and communication interface (e.g., e-mail interface) for connecting the client device to the Internet 1228, the ISP, or LAN 1222, for communication with the servers 1230.

The system 1200 can further include computers (e.g., personal computers, computing nodes) 1205 operating in the same manner as client devices 1201, wherein a user can utilize one or more computers 1205 to manage data in the server 1230.

Figure 13:
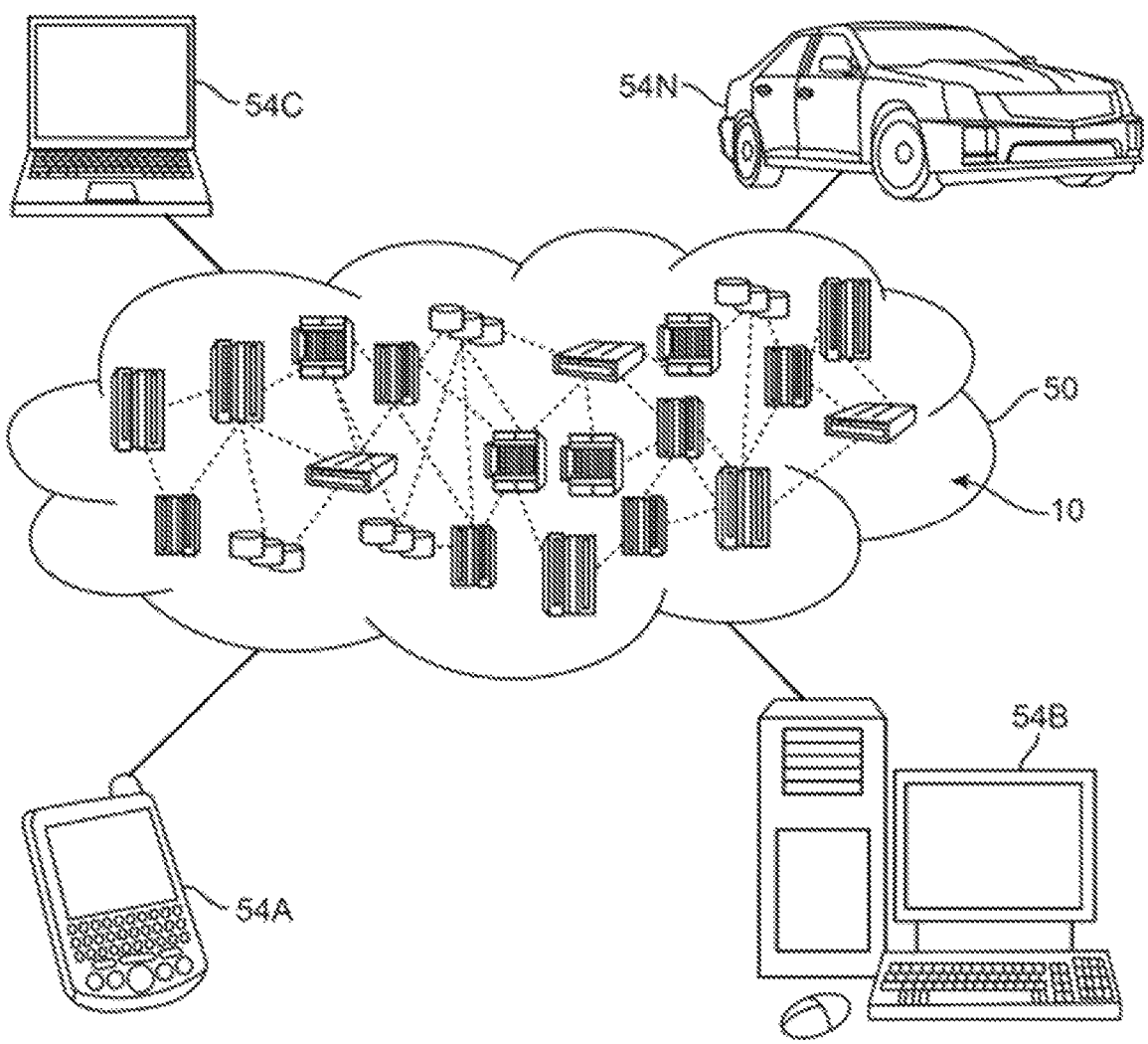
FIG. 13 depicts a cloud computing environment for implementing an embodiment of the system and process disclosed herein.

Referring now to FIG. 13, illustrative cloud computing environment 50 is depicted. As shown, cloud computing environment 50 comprises one or more cloud computing nodes 10 with which local computing devices used by cloud consumers, such as, for example, personal digital assistant (PDA), smartphone, smart watch, set-top box, video game system, tablet, mobile computing device, or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 13 are intended to be illustrative only and that computing nodes 10 and cloud computing environment 50 can communicate with any type of computerized device over any type of network and/or network addressable connection (e.g., using a web browser).

Figure 14:
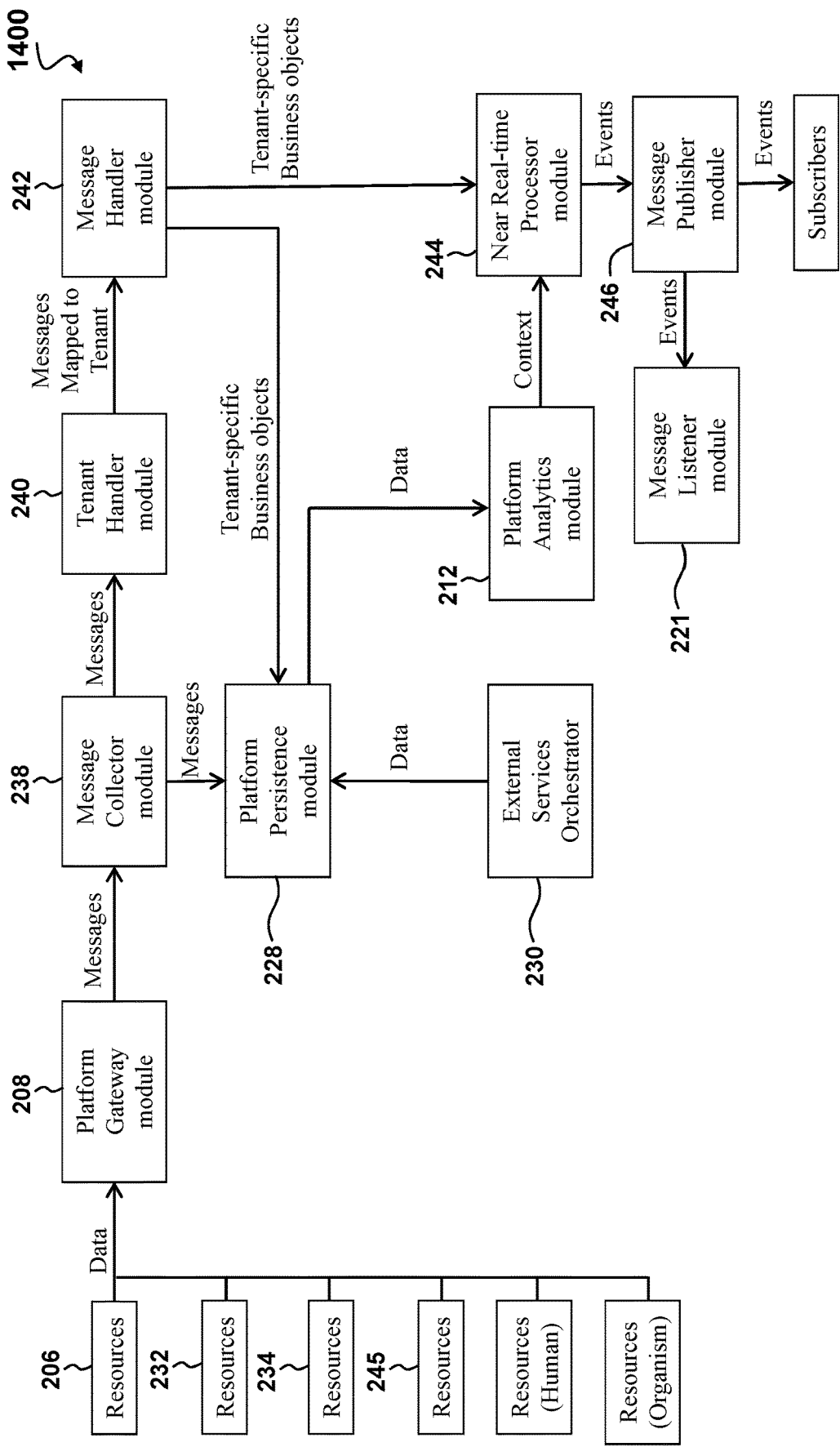
FIG. 14 depicts an exemplary block diagram of an embodiment of the system and process disclosed herein.

FIG. 14 depicts an exemplary flow-chart 1400 of an embodiment of the system and process disclosed herein. A platform gateway module 208 may receive data transmitted from one or more resources (206, 232, 234, 245). The platform gateway module 208 may form one or more messages based on the data from the one or more resources. The message collector module 238 may receive one or more messages formed by the platform gateway module. The message collector module may transmit the received one or more messages to a platform persistence module 228 for storage. The tenant handler module 240 may receive one or more messages from the message collector module. The tenant handler module 240 may map the received one or more messages to a tenant of a plurality of tenants. The message handler module 242 may receive the one or more messages mapped to the tenant from the tenant handler module. The message handler module 242 may form one or more tenant-specific business objects by applying a business logic to the one or more messages based on the mapped tenant. The near real-time processor module 244 may receive the one or more tenant-specific business objects from the message handler module. The near real-time processor module 244 may receive contextual data related to the received one or more tenant-specific business objects from a platform analytics module 212. The near real-time processor module 244 may form one or more events by applying one or more pre-defined analytic models to the received contextual data and the received one or more tenant-specific business objects. The message publisher module 246 may receive one or more events from the near real-time processor module. The received one or more events to one or more subscribers for the one or more events, such as the message listener module 221, where a workflow may be advanced.

The message handler module 242 may also transmit the one or more tenant-specific business objects to the platform persistence module 228 for storage. The platform persistence module 228 may also receive external data from an external services orchestrator module 230. The platform analytics module 212 may also receive data from the platform persistence module 228, where the data from the platform persistence module 228 may include at least one of: messages from the message collector module 238, tenant-specific business objects from the message handler module 242, and external data from the external services orchestrator module 230. The platform analytics module 212 may also form the contextual data containing a real-time view generator module (258, See FIG. 2A) including a near-real time view of data and a batch view generator module (260, See FIG. 2A) including a historical data that does not overlap with the near-real time view of data. The near real-time processor module 244 may also receive contextual data derived from machine learning based on previously received messages, business objects and external data from the platform analytics module 212. The received data may include at least one of: an observed status data, a request data, and an automated sensor data. The one or more resources comprise one or more of: a sensor (306, See FIG. 3), an actuator (308, See FIG. 3), a smart device (302, See FIG. 3), a smartphone 245, a set-top box 234, an external machine-to-machine (M2M) enabler 206, a human input, and an organism input. Forming the one or more messages at the platform gateway module 208 may further include: determining at the platform gateway module 208, a type of resource for the received data; and transforming at the platform gateway module 208, the received data into the message based on the determined type of resource, where the message is a format that may be used by the message collector module. Transforming the received data into the message at the platform gateway module 208 may further include: forming at the platform gateway module 208, an abstracted data, where the abstracted data abstracts out any device-specific or communication protocol-specific information based on the determined type of resource. The message collector module 238 may receive the one or more messages formed by the platform gateway module asynchronously. Transmitting the one or more events to one or more subscribers may further include: receiving at a message listener module 221, the one or more events; and determining at the message listener module 221 and/or app platform module (216, See FIG. 2A), a next step in a workflow based on the received event.

Executing the next step in the workflow may include: receiving at a workflow manager module, a workflow task that requires triggering an actuator in resources, where a Worker associated with the workflow task does cause: sending a message to a Platform SDK (223) to trigger the Actuator, wherein the Platform Services (214) does cause: sending an activation message to the platform Gateway module, which maps the activation message to the appropriate data format to activate such device and initiates: sending such actuator data to resources; where such data is used to trigger such actuator by at least one of: controller (232), software systems (202), and external M2M enablers (206). A platform management portal (218) or apps (224) does seek to activate an actuator in resources (202): sending of an activation message to Platform API Services (274), to trigger such actuator, wherein the platform services (214) does cause sending of an activation message to Platform Gateway, which maps such message to the appropriate data format to activate such actuator and initiates; and sending such actuator data to Resources (102); where such data is used to trigger such actuator by at least one of: controller (232), software systems (202) or external M2M enablers (206).

The platform analytics module 212 may further form the contextual data. The contextual data may contains a result of an analytic model that algorithmically combines a source data from one or more of: data from the platform persistence module, external data, data from an external machine-to-machine (M2M) enabler (206, See FIG. 2A), data from a software system (202, See FIG. 2A), data from an enterprise systems (226, See FIG. 2A), data interactively supplied by one or more users of applications (224, 218, 243, 241, 239, See FIG. 2A), predictive data inferred from the source data, and machine learning data inferred from the source data.

Figure 15A:
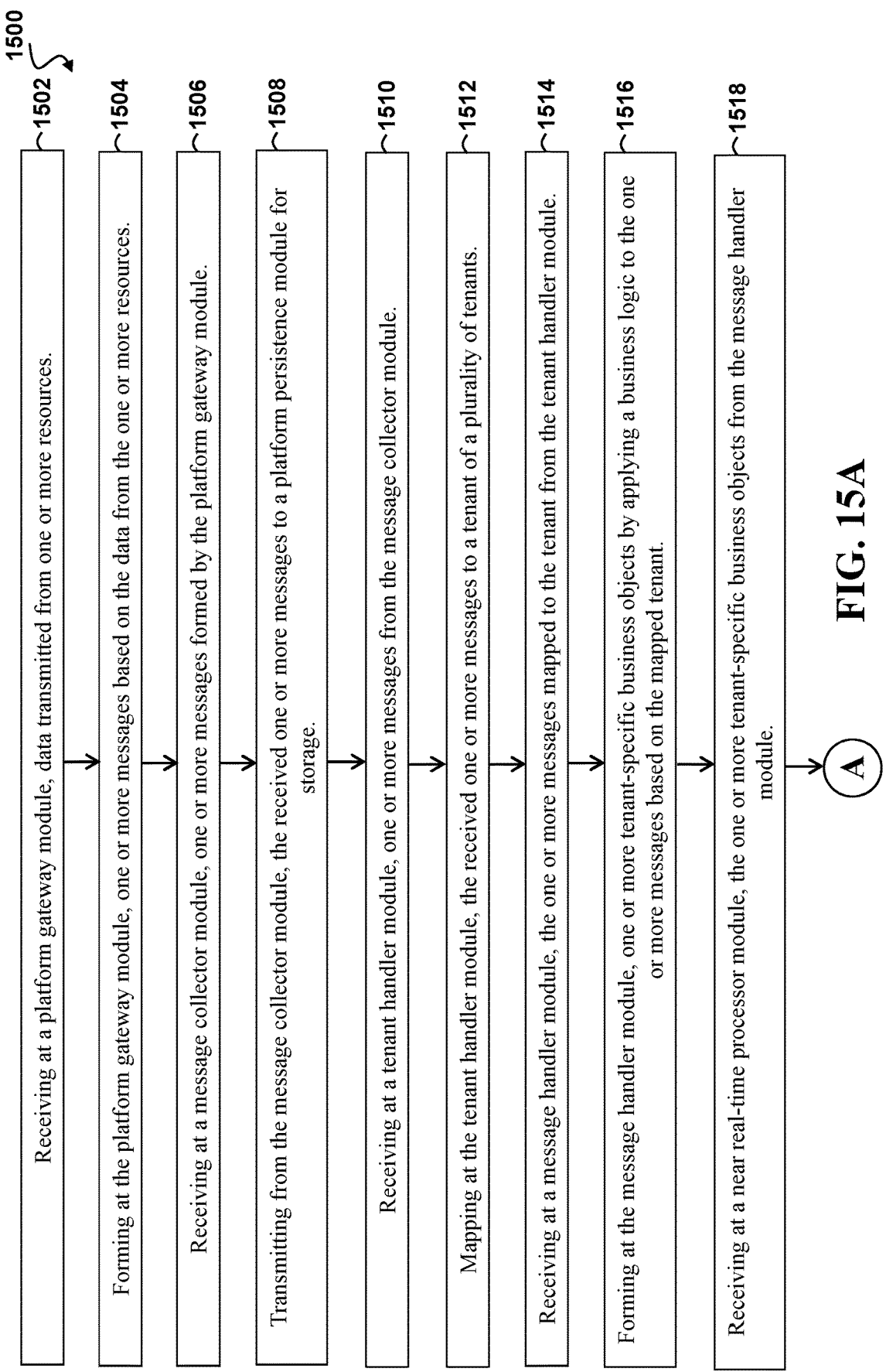
FIGS. 15A-15B depict an exemplary flow chart of an embodiment of the system and process disclosed herein.
Figure 15B:
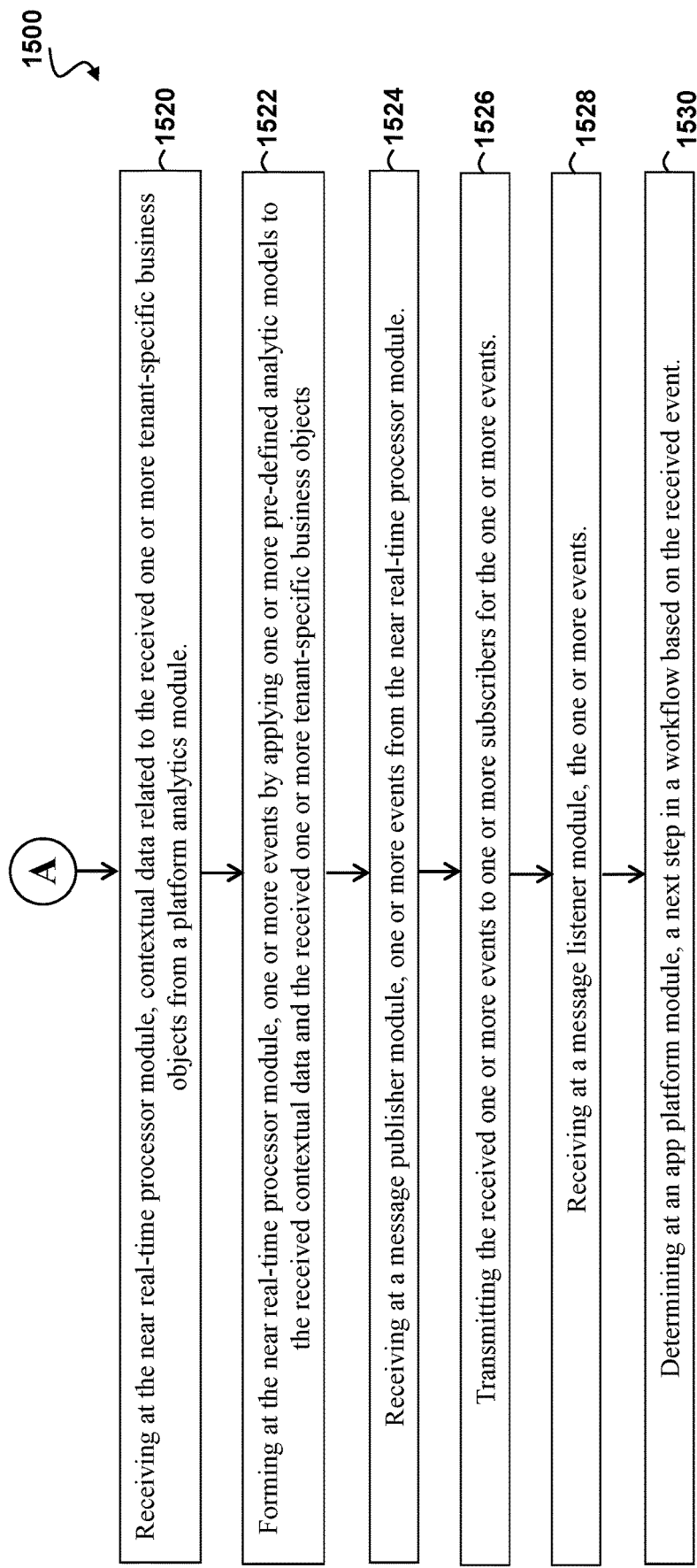

FIGS. 15A-15B depict an exemplary flow chart 1500 of an embodiment of the system and process disclosed herein. Reference character A is used to show the connection between FIGS. 15A-15B. The system and process disclosed herein may include the following steps. Receiving at a platform gateway module 208, data transmitted from one or more resources (202, 206, 232, 234, 245) (step 1502). Forming at the platform gateway module 208, one or more messages based on the data from the one or more resources (step 1504). Receiving at a message collector module 238, one or more messages formed by the platform gateway module (step 1506). Transmitting from the message collector module, the received one or more messages to a platform persistence module 228 for storage (step 1508). Receiving at a tenant handler module 240, one or more messages from the message collector module (step 1510). Mapping at the tenant handler module, the received one or more messages to a tenant of a plurality of tenants (step 1512). Receiving at a message handler module 242, the one or more messages mapped to the tenant from the tenant handler module (step 1514). Forming at the message handler module, one or more tenant-specific business objects by applying a business logic to the one or more messages based on the mapped tenant (step 1516). Receiving at a near real-time processor module 244, the one or more tenant-specific business objects from the message handler module (step 1518). Receiving at the near real-time processor module, contextual data related to the received one or more tenant-specific business objects from a platform analytics module 212 (step 1520). Forming at the near real-time processor module, one or more events by applying one or more pre-defined analytic models to the received contextual data and the received one or more tenant-specific business objects (step 1522). Receiving at a message publisher module 246, one or more events from the near real-time processor module (step 1524). Transmitting the received one or more events to one or more subscribers for the one or more events (step 1526). Receiving at a message listener module 221, the one or more events (step 1528). Determining at an app platform module 216, a next step in a workflow based on the received event (step 1530).

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The examples disclosed were chosen and described in order to best explain the principles of the embodiments and the practical application, and to enable others of ordinary skill in the art to understand the various embodiments with various modifications as are suited to the particular use contemplated.

Though embodiments have been described with reference to certain versions thereof; however, other versions are possible. Therefore, the spirit and scope of the embodiments should not be limited to the description of the preferred versions contained herein.

What is claimed is:

1. A computer implemented method comprising executing on a processor the steps of:
sensing, at a resources module that includes one or more distributed sensor devices, information using the one or more distributed sensor devices;
imputing, at a platforms module that includes a processor with an addressable memory, meaning to the sensed information utilizing one or more analytic models based on one or more inputs of:

a context of the sensed information, wherein the context includes at least one of: data specifying a location of the sensor device, data specifying a type of the sensor device, a time a sensor data from the sensor device was recorded, a time the sensor data from the sensor device was sent, a time the sensor data from the sensor device was received, a state of the sensor device, and a data on an origination of the sensed information;

a previously received sensor data from the sensor device stored in a file system;

a near real-time sensor data from the sensor device;

a near-real time contextual data from the sensor device derived from machine learning based on the platforms module;

a stored information of a relationship between one or more past system actions and one or more outcomes of the one or more past system actions as observed by information received by the sensor devices subsequent to the one or more past system actions; and data external to the system, wherein the data external to the system is not sensor data from the sensor device;

determining, at an applications module that includes a processor with an addressable memory, one or more actions utilizing the one or more analytic models based on inputs from:

the imputed meaning of the sensed information;

data from the one or more inputs utilizing the one or more analytic models to impute meaning of the sensed information;

a result to be achieve subsequent to the determined one or more actions by the applications module, wherein the determined one or more actions are based on the stored information of the relationship between the one or more past system actions and the one or more outcomes of the one or more past system actions, wherein the one or more outcomes provide a benefit to one or more third parties;

learning, at the applications module, from the one or more past system actions;

modifying, at the applications module, the one of more analytic models based on the learning;

optimizing, at the applications module, the one or more analytic models based on the modification;

determining, at the applications module, a next step in a workflow based on a received one or more events to determine one or more actions;

receiving, at the resources module, data from the distributed sensor devices;

forming, at the resources module, one or more messages based on the received data;

receiving, at the platforms module, one or more formed messages;

transmitting, by the platforms module, the received one or more messages to a platform persistence module that includes a processor with an addressable memory for storage;

mapping, by the platforms module, the received one or more messages to a client of a plurality of clients;

forming, by the platforms module, one or more business objects by applying a business logic to the one or more messages based on the mapped client; and forming, by the platforms module, one or more events by applying one or more pre-defined analytic models and context to the one or more business objects, wherein the one or more analytic models and context applied to the one or more business objects comprises a query execution processing component, a prediction execution processing component, and a logging handler component, wherein the query execution processing component performs a required insight on the one or more business objects to retrieve combined views of data, wherein the prediction execution processing component performs machine learning algorithms on a distributed platform for the one or more business objects, and wherein the logging handler component logs all activities of the one or more business objects.

2. The computer-implemented method of claim 1 further comprising:

transmitting, by the applications module, the one or more events to one or more subscribers for the one or more events, wherein one or more of the subscribers are the client.

3. The computer-implemented method of claim 1 wherein the one or more inputs comprise data from activity sensors and temperature sensors in a home of an elderly couple; wherein the context includes whether the elderly couple is at home, past usage patterns received by the sensor devices, and past activity patterns received by the sensor devices; wherein the context reduces false alarms; wherein the near-real time contextual data comprises a GPS location of one or more mobile or wearable devices associated with the elderly couple, one or more social media or calendar events, and machine learning by monitoring past behavior to identify anomalies; and wherein the determined one or more actions comprise a near-real time notification to a caregiver to ensure a well-being of an elderly couple.

4. The computer-implemented method of claim 1 wherein the formed one or more messages are based on at least one of: a client rule, a data aggregation, an abstraction of device-specific information, and an abstraction of protocol-specific information.

5. The computer-implemented method of claim 1 further comprising:

transmitting, by the platforms module, the one or more business objects to the platform persistence module for storage; and receiving, by the platform persistence module, external data for supporting data federation from one or more of: external sources of information through an application program interface (API), a database, and a query.

6. The computer-implemented method of claim 1 wherein the sensed information comprises:

an emergency request data.

7. A system comprising:

a resources module that includes at least one or more distributed sensor devices to sense information;

a platforms module that includes a processor with an addressable memory to impute meaning to the sensed information utilizing one or more analytic models based on one or more inputs of:

a context of the sensed information, wherein the context includes at least one of: data specifying a location of the sensor device, data specifying a type of the sensor device, a time a sensor data from the sensor device was recorded, a time the sensor data from the sensor device was sent, a time the sensor data from the sensor device was received, a state of the sensor device, and a data on an origination of the sensed information;

a previously received sensor data from the sensor device stored in a file system;

a near-real-time sensor data from the sensor device;

a near-real time contextual data from the sensor device derived from machine learning based on the platforms module;
a stored information of a relationship between one or more past system actions and one or more outcomes of the one or more past system actions as observed by information received by the sensor devices subsequent to the one or more past system actions; and
data external to the system, wherein the data external to the system is not sensor data from the sensor device; and
an applications module that includes a processor with an addressable memory to:
determine one or more actions utilizing the one or more analytic models based on inputs from:
the imputed meaning of the sensed information; data from the one or more inputs utilizing the one or more analytic models to impute meaning of the sensed information;
a result to be achieved subsequent to the determined one or more actions by the applications module,
wherein the determined one or more actions are based on the stored information of the relationship between the one or more past system actions and the one or more outcomes of the one or more past system actions, and wherein the one or more outcomes provide a benefit to one or more third parties;
learn from the one or more past system actions;
modify the one of more analytic models based on the learning;
optimize the one or more analytic models based on the modification; and
determine a next step in a workflow based on a received one or more events to determine one or more actions;
wherein the platforms module is further configured to:
receive one or more formed messages;
transmit the received one or more messages to a platform persistence module that-includes a processor with an addressable memory for storage;
map the received one or more messages to a client of a plurality of clients;
form one or more business objects by applying a business logic to the one or more messages based on the mapped client; and
form one or more events by applying one or more pre-defined analytic models and context to the one or more business objects, wherein the one or more analytic models and context applied to the one or more business objects comprises a query execution processing component, a prediction execution processing component, and a logging handler component, wherein the query execution processing component performs a required insight on the one or more business objects to retrieve combined views of data, wherein the prediction execution processing component performs machine learning algorithms on a distributed platform for the one or more business objects, and wherein the logging handler component logs all activities for the one or more business objects.

8. The system of claim 7 wherein the resources module is further configured to:
receive data from the distributed sensor devices; and
form one or more messages based on the received data.

9. The system of claim 7 wherein the applications module is further configured to: transmit the one or more events to one or more subscribers for the one or more events, and wherein one or more of the subscribers are the client, and wherein the formed one or more messages are based on at least one of: a client rule, a data aggregation, an abstraction of device-specific information, and an abstraction of protocol-specific information.

10. The system of claim 7 wherein the one or more inputs comprise data from activity sensors and temperature sensors in a home of an elderly couple; wherein the context includes whether the elderly couple is at home, past usage patterns received by the sensor devices, and past activity patterns received by the sensor devices; wherein the context reduces false alarms; and wherein the determined one or more actions comprise a near-real time notification to a caregiver to ensure a well-being of an elderly couple.

11. The system of claim 10 wherein the near-real time contextual data comprises a GPS location of one or more mobile or wearable devices associated with the elderly couple, one or more social media or calendar events, and machine learning by monitoring past behavior to identify anomalies.

12. The system of claim 7 wherein the platforms module is further configured to:
transmit the one or more business objects to the platform persistence module for storage;
receive data from the platform persistence module, wherein the data from the platform persistence module comprises at least one of: messages, business objects, and external data;
form contextual data comprising a near-real time view of data and a historical data that does not overlap with the near-real time view of data; and
wherein the platform persistence module is further configured to receive external data, for supporting data federation, from one or more of: external sources of information through an application program interface (API), a database, and a query.

13. The system of claim 7 wherein the data external to the system comprises: a weather, a receipt of a package, and a human initiated request.

14. The system of claim 7 wherein the platforms module is further configured to:
receive contextual data derived from machine learning based on previously received messages, business objects and external data.

15. The system of claim 7 wherein the sensed information comprises an emergency request data.

16. The system of claim 7 wherein the one or more distributed sensor devices comprise one or more of: a sensor, an actuator, a smart device, a smartphone, a set-top box, an external machine-to-machine (M2M) enabler, a human input, and an organism input.

17. The system of claim 7 wherein the platforms module is further configured to:
determine a type of resource for the sensed information; and
transform the sensed information into the message based on the determined type of resource, wherein the message is a format usable by the platforms module.

18. The system of claim 17 wherein the platforms module is further configured to: form an abstracted data, wherein the abstracted data abstracts out any device-specific or communication protocol-specific information based on the determined type of resource.

19. The system of claim 7 wherein the platforms module receives the one or more formed messages asynchronously.

20. The system of claim 7 wherein the platforms module is further configured to: form contextual data, wherein the contextual data contains a result of an analytic model that algorithmically combines a source data from one or more of: data from the platform persistence module, external data, data from an external machine-to-machine (M2M) enabler, data from a software system, data from an enterprise systems, data interactively supplied by one or more users of applications, predictive data inferred from the source data, and machine learning data inferred from the source data.

* * * * *